(12) United States Patent
Aotsuka

(10) Patent No.: US 7,463,287 B2
(45) Date of Patent: Dec. 9, 2008

(54) SOLID-STATE IMAGE PICK-UP DEVICE AND IMAGE PICK-UP APPARATUS CAPABLE OF DISTINGUISHING A PHOTOGRAPHING LIGHT SOURCE TYPE

(75) Inventor: Yasuo Aotsuka, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 663 days.

(21) Appl. No.: 10/627,742

(22) Filed: Jul. 28, 2003

(65) Prior Publication Data
US 2005/0073592 A1 Apr. 7, 2005

(30) Foreign Application Priority Data
Jul. 29, 2002 (JP) .......................... P. 2002-219843
Sep. 5, 2002 (JP) .......................... P. 2002-260163

(51) Int. Cl.
H04N 9/73 (2006.01)
H04N 5/335 (2006.01)
H04N 5/222 (2006.01)
G01J 3/50 (2006.01)

(52) U.S. Cl. ................. 348/223.1; 348/224.1; 348/273; 348/370; 250/226

(58) Field of Classification Search ............... 348/223.1, 348/224.1, 273, 371; 250/226
See application file for complete search history.

(56) References Cited

U.S. PATENT DOCUMENTS

| 5,644,358 | A | * | 7/1997 | Miyano et al. ........... 348/223.1 |
|---|---|---|---|---|
| 5,691,772 | A | * | 11/1997 | Suzuki .................... 348/223.1 |
| 5,732,293 | A | * | 3/1998 | Nonaka et al. ............... 396/157 |
| 6,181,374 | B1 | * | 1/2001 | Saito et al. ................ 348/223.1 |
| 6,236,434 | B1 | | 5/2001 | Yamada |
| 6,459,449 | B1 | * | 10/2002 | Juen ......................... 348/223.1 |
| 6,515,275 | B1 | * | 2/2003 | Hunter et al. ............... 250/226 |
| 7,006,135 | B2 | * | 2/2006 | Ishimaru et al. ........... 348/222.1 |
| 7,030,916 | B2 | * | 4/2006 | Aotsuka ................... 348/223.1 |
| 7,148,920 | B2 | * | 12/2006 | Aotsuka ................... 348/223.1 |

FOREIGN PATENT DOCUMENTS

| JP | A-07-038916 | | 2/1995 |
|---|---|---|---|
| JP | 10-136391 A | | 5/1998 |
| JP | 11-113005 | * | 4/1999 |

\* cited by examiner

Primary Examiner—Nhan T Tran
(74) Attorney, Agent, or Firm—Birch, Stewart, Kolasch & Birch, LLP

(57) ABSTRACT

In a solid-state image pick-up device provided with a pixel for distinguishing a light source type in a predetermined region of the solid-state image pick-up device, a filter for transmitting a light having at least a wavelength of 505 nm to 530 nm is provided as a filter for distinguishing a light source type to be mounted on the pixel for distinguishing a light source type. It is more suitable that the filter for distinguishing a light source type should also transmit a light having a wavelength of 640 nm or more. Consequently, a sunlight and a fluorescent lamp can be distinguished from each other. In addition, it is also possible to easily distinguish an ordinary type white fluorescent lamp from the daylight color, day white color and bulb color of a 3-wavelength type fluorescent lamp.

15 Claims, 18 Drawing Sheets

Prior Art

SOLID-STATE IMAGE PICK-UP DEVICE AND IMAGE PICK-UP APPARATUS CAPABLE OF DISTINGUISHING A PHOTOGRAPHING LIGHT SOURCE TYPE

BACKGROUND OF THE INVENTION

1. Field of the Invention

The present invention relates to a solid-state image pick-up device for color image pick-up such as a CCD or a CMOS sensor, and more particularly to a solid-state image pick-up device capable of distinguishing a photographing light source type with high precision and recording a color image in an excellent white balance and an image pick-up apparatus mounting the solid-state image pick-up device.

2. Description of the Related Art

FIG. 22 is a plane view showing a conventional solid-state image pick-up device described in JP-A-10-136391, for example. The solid-state image pick-up device is referred to as a so-called honeycomb pixel arrangement having such a structure that a photodiode including a large number of green (G) color filters is provided at a predetermined interval vertically and horizontally and photodiodes having blue (B) and red (R) color filters are alternately provided in positions shifted by a ½ pitch from each photodiode in each row and each column. In an example shown in the drawing, octagonal frames represented as "R", "G" and "B" indicate red, green and blue color filters respectively, and corresponding photodiodes are provided on the underside thereof (the underside of a paper). More accurately, the octagonal frame represents the shape of the photodiode, and the red, green and blue color filters are provided in larger sizes than the sizes of the octagonal frames (for example, an octagon or a square).

A light is incident through each color filter so that a signal charge stored in each photodiode is read onto a vertical transfer path 20 formed on the side of each photodiode as shown in an arrow a. The signal charge is transferred along the vertical transfer path 20 as shown in an arrow b to reach a horizontal transfer path 21. Subsequently, the signal charge is transferred along the horizontal transfer path 21 as shown in an arrow c and is read from the solid-state image pick-up device. An amount of the signal charge read from each pixel (photodiode) has a value corresponding to an amount of a light received by each photodiode.

Thus, the color filter is superposed on the surface of each photodiode of the solid-state image pick-up device. The color filter is manufactured by using pigments or dyes, for example. FIG. 23 shows the spectral sensitivity of a digital camera using a solid-state image pick-up device provided with a conventional each color filter in which the color filters R, G and B transmit lights having wavelengths corresponding to red, green and blue colors and cut lights having other wavelengths. For example, the conventional red color filter R is manufactured to transmit a light having a wavelength of 580 nm or more and to uniformly cut lights having lower wavelengths as shown in FIG. 23.

In the case in which various scenes are to be photographed by means of an image pick-up apparatus such as a digital still camera or a digital video camera which mounts a solid-state image pick-up device, the photographing is carried out under various illuminating light sources. For this reason, it is preferable that the image pick-up apparatus should automatically regulate the gains of R, G and B signals to adjust a white balance also in the photographing under any light source. However, the image pick-up apparatus is to detect a photographing light source type with high precision in order to adjust the white balance irrespective of the photographing light source type.

For this reason, conventionally, a color temperature detecting circuit is mounted on the image pick-up apparatus and one image photographed by the solid-state image pick-up device is divided into 8×8=64 regions, for example, and a set of data of ΣR/ΣG and data of ΣB/ΣG in each divided region are thus obtained, and these 64 sets of data are plotted into a two-dimensional space extended over an R/G axis and a B/G axis and a photographing light source type is detected based on the shape of the distribution (ΣR, ΣG and ΣB represent the sum of respective color signals).

According to the color temperature detecting circuit in accordance with the conventional art, it is possible to roughly distinguish the photographing light source type. However, there is a problem in that it is hard to distinguish a leaf green color under a dark sunlight from a white color under an ordinary type white fluorescent lamp (an F6 light source) or a 3-wavelength type fluorescent lamp, for example.

In order to automatically regulate the white balance very finely by using the image pick-up apparatus, it is necessary to distinguish a sunlight from a fluorescent lamp with high precision and to distinguish different kinds of fluorescent lamps with high precision (for example, to distinguish an ordinary type white fluorescent lamp, a 3-wavelength type daylight color fluorescent lamp, a 3-wavelength type day white fluorescent lamp and a 3-wavelength type bulb color fluorescent lamp). It has been desired to develop a technology for implementing the distinction of these photographing light source types with high precision at a low cost.

Further, in a digital camera mounting such a solid-state image pick-up device, it is effective that the spectral sensitivity of the green color is broadened toward the long wavelength side, and furthermore, the spectral sensitivity of the red color is broadened toward the short wavelength side as in characteristic lines G' and R' shown in broken lines of FIG. 23 in order to enhance the sensitivity of the solid-state image pick-up device.

As described above, it is effective that the spectral sensitivities of R and G are broadened in order to enhance the sensitivity of the solid-state image pick-up device. On the other hand, however, there is a problem in that the spectral sensitivities of R and G are broadened, resulting in dirty colors and a reduction in the reproducibility of the colors.

In the case in which the image of a human flesh color is picked up under an F6 light source (an ordinary type white fluorescent lamp), particularly, the flesh color becomes close to yellowish green (YG) if the spectral sensitivity of G is broadened toward the long wavelength side, which is not preferable. This is mainly caused by the fact that a radiant energy generated from the F6 light source is biased toward the vicinity of 580 nm as shown in FIG. 2. When the spectral sensitivity of G is broadened to reach the wavelength region, the flesh color is greatly close to YG. Also in an F12 light source (3-wavelength type bulb color fluorescent lamp), moreover, the flesh color is closer to YG if the sensitivity of G reaches a radiation peak (approximately 610 nm) more greatly in a red light region.

More specifically, if the spectral sensitivity of G is broadened toward the long wavelength side in such a manner that a sensitivity at 600 nm is "10" or more when the peak sensitivity of G is set to be "100", the flesh color is closer to YG. If the spectral sensitivity of R is broadened toward the short wavelength side in such a manner that the sensitivity of R at 575 nm is "10" or more when the peak sensitivity of R is set to be "100", the flesh color is close to YG under the F6 light source.

For this reason, the conventional digital camera has a problem in that the spectral sensitivities of R and G cannot be greatly broadened and the sensitivity of the digital camera cannot be enhanced.

SUMMARY OF THE INVENTION

It is an object of the invention to provide a solid-state image pick-up device and an image pick-up apparatus which can implement the distinction of a sunlight from a fluorescent lamp with high precision and the distinction of different kinds of fluorescent lamps with high precision at a low cost.

A solid-state image pick-up device to achieve the object is provided with a pixel for distinguishing a light source type in a predetermined region of the solid-state image pick-up device, wherein a filter for transmitting a light having at least a wavelength of 520 nm to 580 nm is provided as a filter for distinguishing a light source type to be mounted on the pixel for distinguishing a light source type. By this structure, it is possible to carry out the distinction of a sunlight from a fluorescent lamp and the distinction of the type of the fluorescent lamp with high precision.

It is suitable that the filter for distinguishing a light source type should also serve to transmit a light having a wavelength of 640 nm or more. By this structure, it is possible to more easily distinguish a fluorescent lamp which does not include a light having a wavelength of 640 nm or more from a sunlight.

It is more suitable that the predetermined region should be an invalid pixel region of the solid-state image pick-up device. By this structure, it is possible to provide a pixel for distinguishing a light source type in a place which does not influence the pick-up of a color image.

An image pick-up apparatus to achieve the object comprises an optical lens system, the solid-state image pick-up device according to any of claims 1 to 3 which serves to convert a light signal incident through the optical lens system into an electric signal, and control means for processing a signal charge read from the pixel for distinguishing a light source type of the solid-state image pick-up device to distinguish a photographing light source type and for automatically adjusting a white balance of a color pick-up image of the solid-state image pick-up device. By this structure, it is possible to always record a color image in an excellent white balance irrespective of any situation in which the photographing light source is varied.

It is an object of the invention to provide a digital camera having a high sensitivity and an excellent color reproducibility of a flesh color.

A digital camera to achieve the object comprises color image pick-up means for picking up a color image of an object and signal processing means for separating a color signal output from the color image pick-up means into a luminance signal and a color difference signal and multiplying the color difference signal by a color difference matrix, thereby carrying out a color correction, wherein there is provided color difference matrix switching means for preparing a color difference matrix obtained when a photographing light source is a sunlight and a color difference matrix obtained when the photographing light source is a specific light source other than the sunlight and switching the color difference matrix depending on whether a light source in the photographing is the sunlight or the specific light source, thereby carrying out the color correction.

By this structure, the reproducibility of a color can be enhanced without depending on a light source type. Consequently, it is possible to pick up an image having a fine color.

It is suitable that the specific light source should be an F6 light source. By this structure, it is possible to achieve both the excellent color reproducibility of a pick-up image under the F6 light source and an increase in a camera sensitivity.

It is more suitable that the specific light source should be an F12 light source. By this structure, it is possible to achieve both the excellent color reproducibility of a pick-up image under the F12 light source and an increase in a camera sensitivity.

It is further suitable that the specific light source should include an F6 light source and an F12 light source, each of color difference matrices for the F6 light source and the F12 light source should be prepared as the color difference matrix for the specific light source, and the switching means should switch the color difference matrix depending on whether the specific light source is the F6 light source or the F12 light source, thereby carrying out the color correction.

By this structure, the color reproducibility can be enhanced and a camera sensitivity can be increased even if the specific light source is the F6 light source or the F12 light source.

It is further suitable that a light source type distinction sensor should further be provided, the switching means automatically switching a color difference matrix based on a result of detection of the light source type distinction sensor.

By this structure, the light source type can be decided with high precision and an excellent color image can be picked up.

It is further suitable that the light source type distinction sensor should be incorporated integrally with the color image pick-up means. By this structure, the number of components can be decreased and the price of the digital camera can be reduced.

DESCRIPTION OF THE PREFERRED EMBODIMENTS

An embodiment of the invention will be described below with reference to the drawings.

Figure 1:
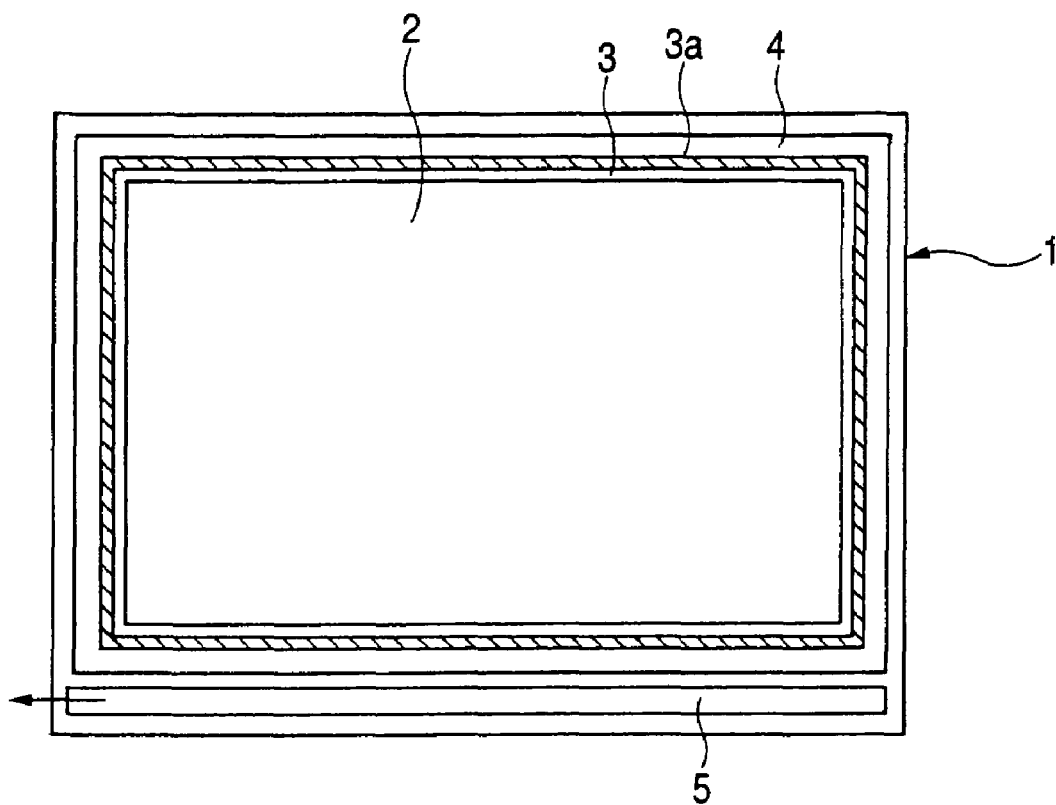
FIG. 1 is a schematic plane view showing a solid-state image pick-up device according to an embodiment of the invention.
Figure 22:
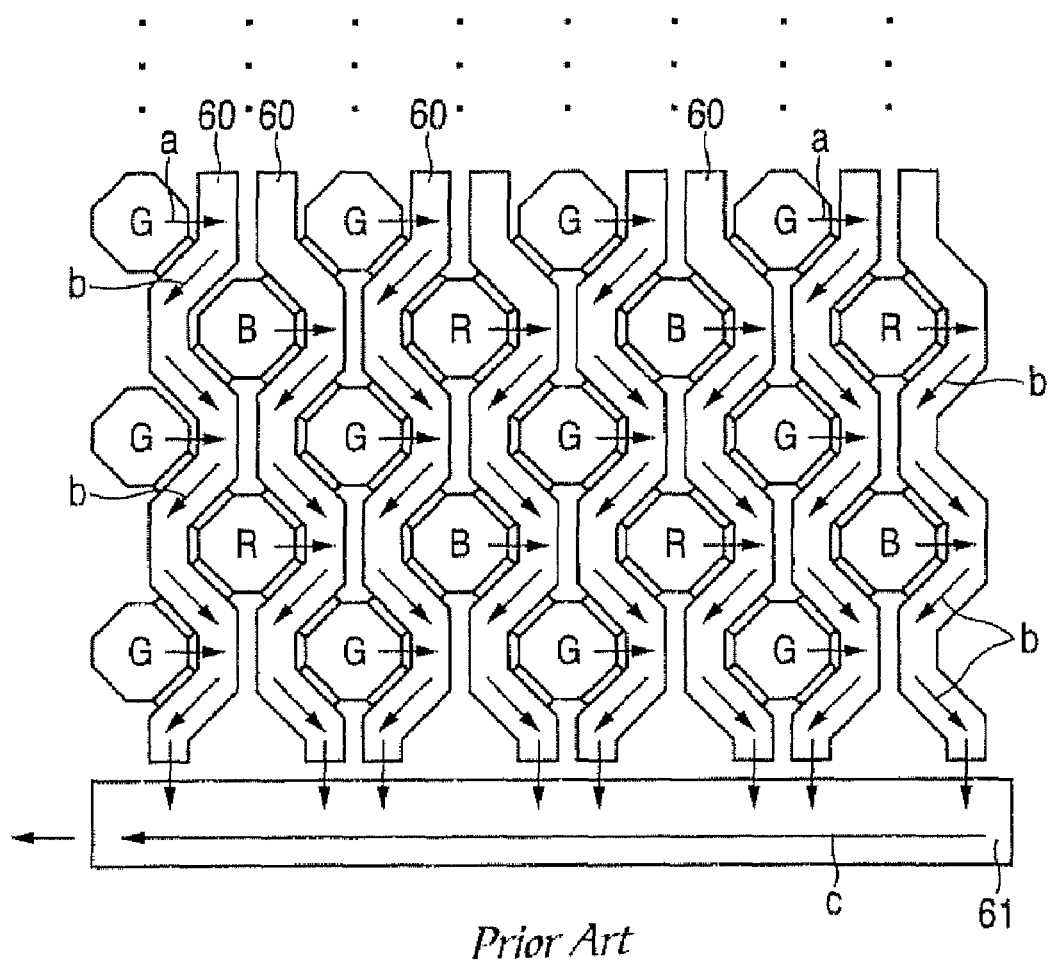
FIG. 22 is a diagram showing a pixel arrangement according to an example of the solid-state image pick-up device.

FIG. 1 is a schematic plane view showing a solid-state image pick-up device to be mounted on an image pick-up apparatus according to the embodiment of the invention. In a solid-state image pick-up device 1, a large number of R, G and B pixels having the honeycomb arrangement described with reference to FIG. 22 are mounted vertically and horizontally. The solid-state image pick-up device according to the invention is not restricted to have the honeycomb arrangement but the invention can also be applied to a Bayer type solid-state image pick-up device.

In the solid-state image pick-up device 1, a valid pixel region 2 for picking up a color image occupies most of a center, an invalid pixel region 3 for carrying out a simultaneous processing in the peripheral pixels of the valid image region 2 is provided around the valid pixel region 2 and a pixel region 4 for dark noise detection on which a photographing light is not incident is provided around the invalid pixel region 3, and a signal charge read from the pixel of each of the regions 2, 3 and 4 onto a vertical transfer path is transferred to a horizontal transfer path 5 and is output from the horizontal transfer path 5 to the outside of the solid-state image pick-up device 1.

The solid-state image pick-up device 1 according to the embodiment is characterized in that a different color filter from R, G and B is disposed in a pixel provided over the whole circumference of a peripheral region 3a of the invalid pixel region 3 (which is shown in a slant line), that is, a rectangular region 3a on which a photographing light is incident at the inside of the pixel region 4 for dark noise detection. The color filter serves to distinguish a photographing light source type and the spectral sensitivity of a pixel provided with the color filter will be hereinafter referred to as a fourth spectral sensitivity next to R, G and B.

Figure 2:
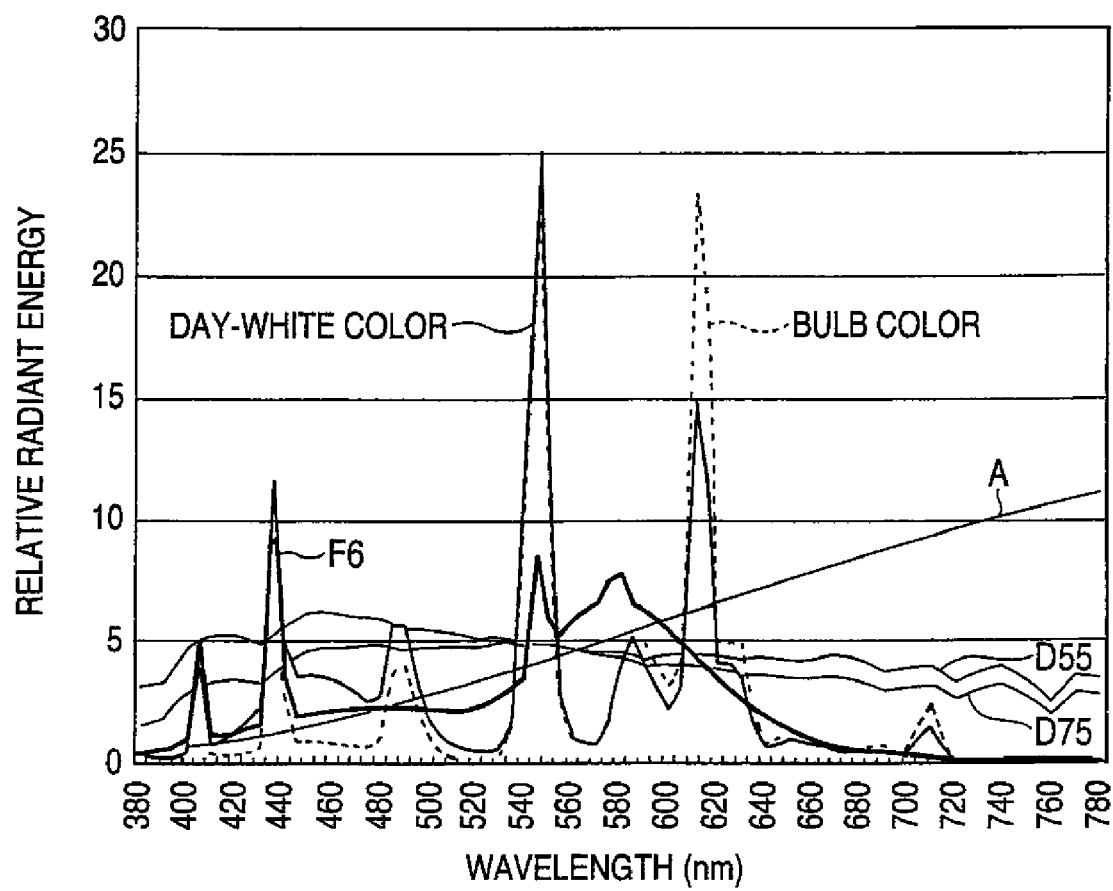
FIG. 2 is a graph in which the wavelengths of various light sources are compared with a relative radiant energy with an illuminance equalized.

FIG. 2 is a graph in which the wavelengths of various light sources are compared with a relative radiant energy with an illuminance equalized. There are shown six kinds of light sources, that is, D55 (a sunlight), D75 (a sunlight), A (a tungsten light), F6 (an ordinary type white fluorescent lamp), a 3-wavelength type daylight white fluorescent lamp and a 3-wavelength type bulb color fluorescent lamp.

As is apparent from the graph, within a range of a wavelength of 500 nm to 535 nm, a radiant energy is obtained in order of (large) D75, D55, A>F6 >3-wavelength type fluorescent lamp (small).

Moreover, the graph of the 3-wavelength type daylight color fluorescent lamp is not shown in FIG. 2 and the following order is obtained within the range of the wavelength of 500 nm to 535 nm:

(large) daylight color>day white color >bulb color (small).

Figure 3:
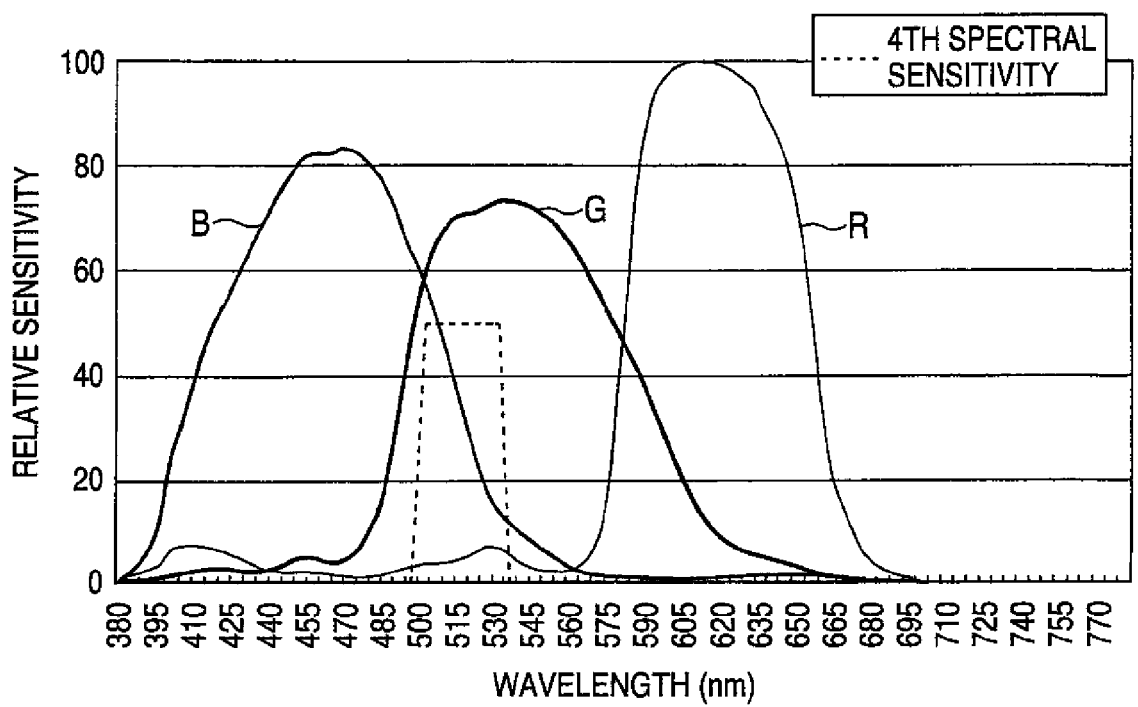
FIG. 3 is a graph showing an example of a fourth spectral sensitivity and spectral sensitivities of R, G and B according to the embodiment of the invention.
Figure 23:
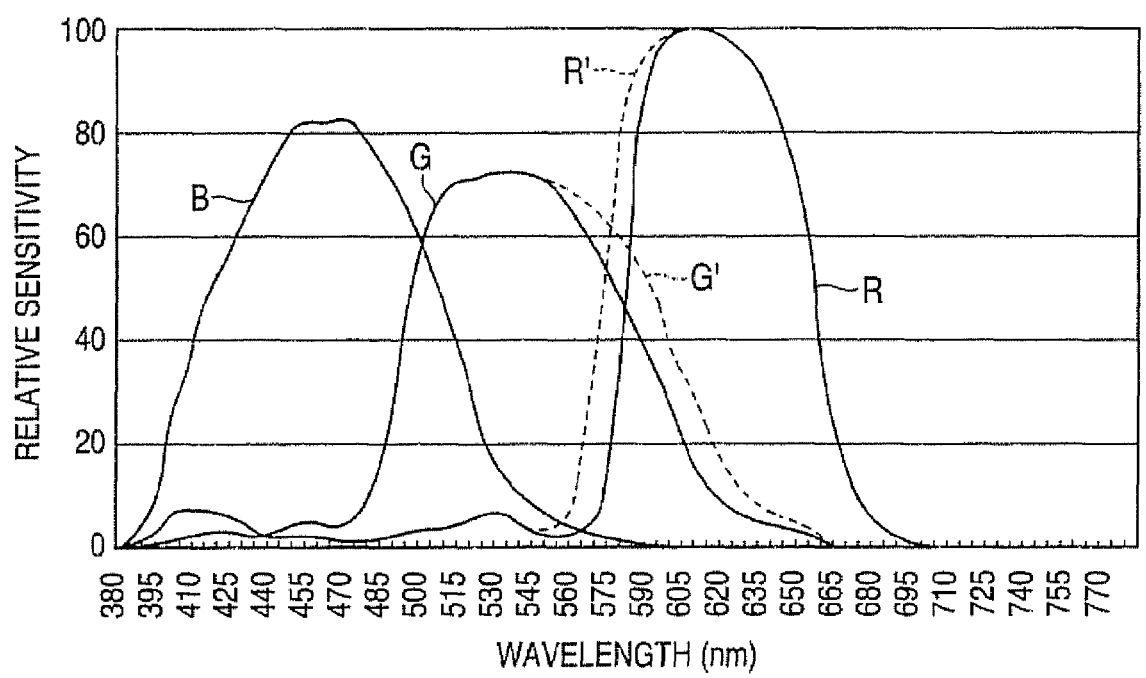
FIG. 23 is a graph for explaining the spectral sensitivities of R, G and B pixels of a digital camera using the solid-state image pick-up device and broadening thereof.

More specifically, a color filter for transmitting a light having the wavelength of 500 nm to 535 nm is provided in a pixel (a photodiode) so that a light source type can be distinguished with high precision based on an amount of a signal charge read from the pixel as will be described below. The embodiment is characterized in that the color filter for transmitting the light having the wavelength of 500 nm to 535 nm (which will be hereinafter referred to as a filter for distinguishing a light source type) is provided in the pixel of the region 3a (a pixel for distinguishing a light source type) to have the fourth spectral sensitivity. FIG. 3 is a graph showing the fourth spectral sensitivity together with the spectral sensitivities of R, G and B illustrated in FIG. 23.

Description will be given to a method of distinguishing a light source type from the signal charge of a pixel mounting the light source type distinction filter with high precision.

An optional color has an optional spectral characteristic $(P(\lambda))$. When the color is photographed with a certain spectral sensitivity $(S(\lambda))$ under a certain light source $(L(\lambda))$, an output value Xs is obtained as follows:

$$Xs = \int P(\lambda) \cdot L(\lambda) \cdot S(\lambda) \cdot d\lambda$$

If a suffix "s" of Xs represents the type of the spectral sensitivity, the fourth spectral sensitivity is represented by X4 and the spectral sensitivities of R, G and B are represented by Xr, Xg and Xb, respectively.

In the case in which a photographing light source type is to be distinguished, it is necessary to equalize the illuminance of the photographing light source. The illuminance can be equalized approximately by mainly dividing X4 by Xg. A value of X4/Xg (or X4/(kg·Xg+kb·Xb+kr·Xr): kg, kb and kr are coefficients) is entirely varied depending on the photographed color.

However, when the colors of all the pixels of a photographed scene are generally mixed, the colors tend to be close to gray (G). When the colors of a plurality of pixels of the photographed scene are mixed to calculate the ratio value M=X4/Xg, therefore, the following equation can be obtained:

$$M = \int (P1 + P2 + \ldots + Pn) \cdot L(\lambda) \cdot S(\lambda) \cdot d\lambda / Xg$$
$$= \int G \cdot L(\lambda) \cdot S(\lambda) \cdot d\lambda / Xg$$

wherein "G" represents the reflectance of the gray and is a constant. Therefore, the ratio value M is a value peculiar to $L(\lambda)$, that is, a light source.

Although the conclusion is reached on the assumption that the colors of the pixels are mixed to be the gray G, the gray G is not obtained depending on a photographed scene in some cases. For example, in a scene full of a leaf green color which is photographed in a forest or a scene full of a flesh color such as the close-up scene of a person, the gray G is not obtained even if the colors of the pixels are mixed. In such a case, however, it is possible to equalize the ratio value M to be a value obtained with the gray G by regulating the coefficients kr, kg and kb.

It is preferable that the values of the coefficients kr, kg and kb should be determined in such a manner that the value of M is varied for each light source. It is preferable that these coefficients should be set at time of the shipment of an image pick-up apparatus, and particularly, should be set to have an optimum value depending on a gain for correcting the deviation of a color balance to be the individual difference of the image pick-up apparatus when determining the same gain at time of the shipment.

As described above, it is possible to distinguish a photographing light source type based on the ratio value M obtained by dividing the amount of the signal charge read from the pixel having the fourth spectral sensitivity (the pixel for distinguishing a light source type) by an output sent from the pixel having the spectral sensitivity of B, G or R.

Figure 4:
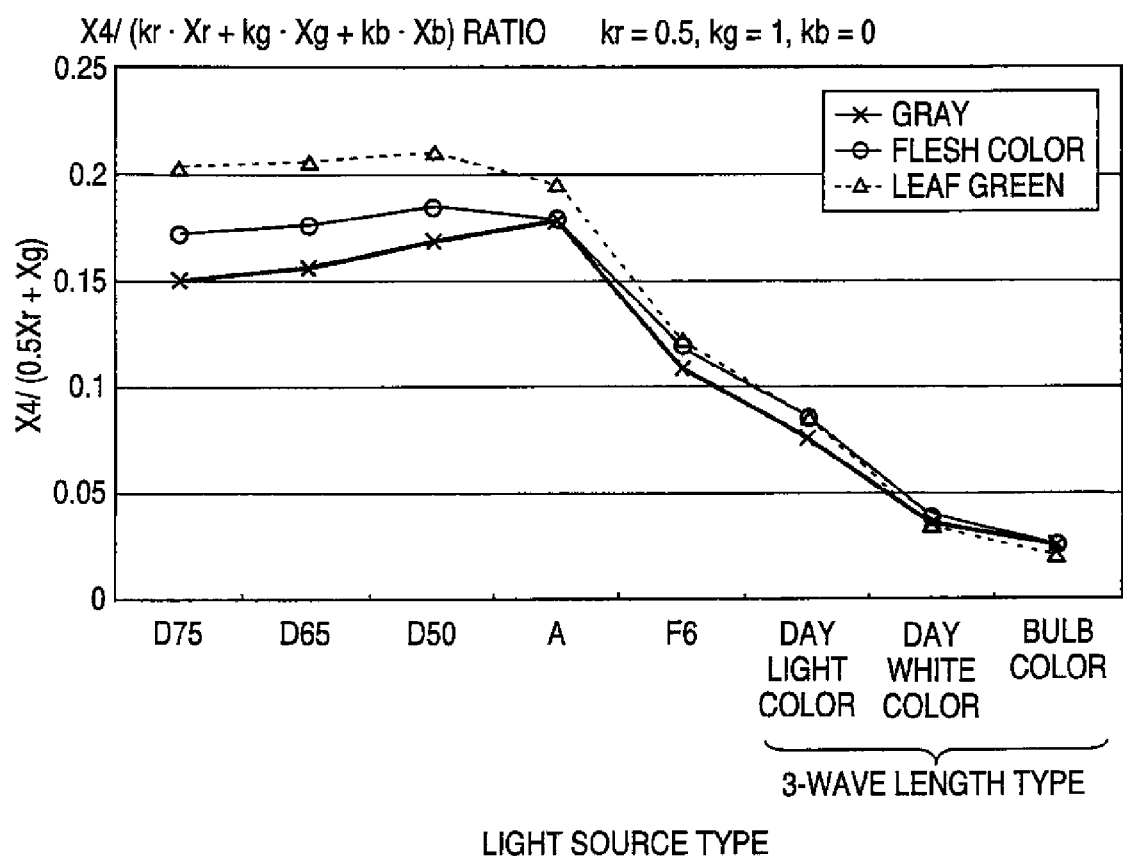
FIG. 4 is a chart showing a result of distinction which is obtained by using a pixel for distinguishing a light source type having the fourth spectral sensitivity illustrated in FIG. 3.

FIG. 3 shows the spectral sensitivity of the image pick-up apparatus which is obtained in combination with the spectral transmitting characteristic of an infrared ray cut filter or a camera lens. FIG. 4 shows a result obtained by adjusting the white balances of R, G and B to a sunlight (D55) of 5500K, acquiring X4, Xr, Xg and Xb in the photographing of each of the scenes having a gray color, a human flesh color and a leaf green color under various light sources and calculating a change in $M=X4/(kg \cdot Xg + kb \cdot Xb + kr \cdot Xr)$ by means of a photographing light source. In this example, kr=0.5, kg=1 and kb=0 are set.

As is apparent from FIG. 4, the ratio value $M=X4/(kg \cdot Xg + kb \cdot Xb + kr \cdot Xr) = X4/(0.5Xr + Xg)$ to be an axis of ordinate is set for each photographing light source as follows even if the photographed scene has the gray color, the human flesh color or the leaf green color:

(large) sunlight, A light source>F6 light source >3-wavelength type daylight color fluorescent lamp >3-wavelength type day white fluorescent lamp >3-wavelength type bulb color fluorescent lamp (small).

Consequently, it is apparent that the photographing light source type can be distinguished with high precision. In this example, it is hard to distinguish the sunlight from the A light source. Since the sunlight and the A light source can be distinguished with high precision by means of a conventional color temperature detecting circuit, however, there is no problem.

The light source type distinction filter according to the embodiment serves to transmit a light having a wavelength of 500 nm to 530 nm. As is apparent from FIG. 2, by reducing a transmission range and using a filter for transmitting a light having a wavelength of 505 nm to 530 nm, it can be expected that a distinguishing capability is more enhanced. Therefore, PY139, PR122 and PB15:6 were mixed as a pigment for manufacturing the light source type distinction filter, thereby manufacturing a pixel for distinguishing a light source type which has the fourth spectral sensitivity shown in FIG. 5. The fourth spectral sensitivity is obtained from the image pick-up apparatus (a spectral sensitivity including the characteristic of an infrared ray cut filter or a camera lens).

It is hard to manufacture a color filter for transmitting a light only within a narrow range. Referring to a fourth spectral sensitivity having a base portion expanded, for example, it is sufficient that the fourth spectral sensitivity shown in FIG. 5 can be substantially obtained by subtracting the output of each of the pixels of R, G and B from the output of the pixel for distinguishing a light source type in the case in which the base portion can be cancelled from the spectral sensitivities of R, G and B.

Figure 5:
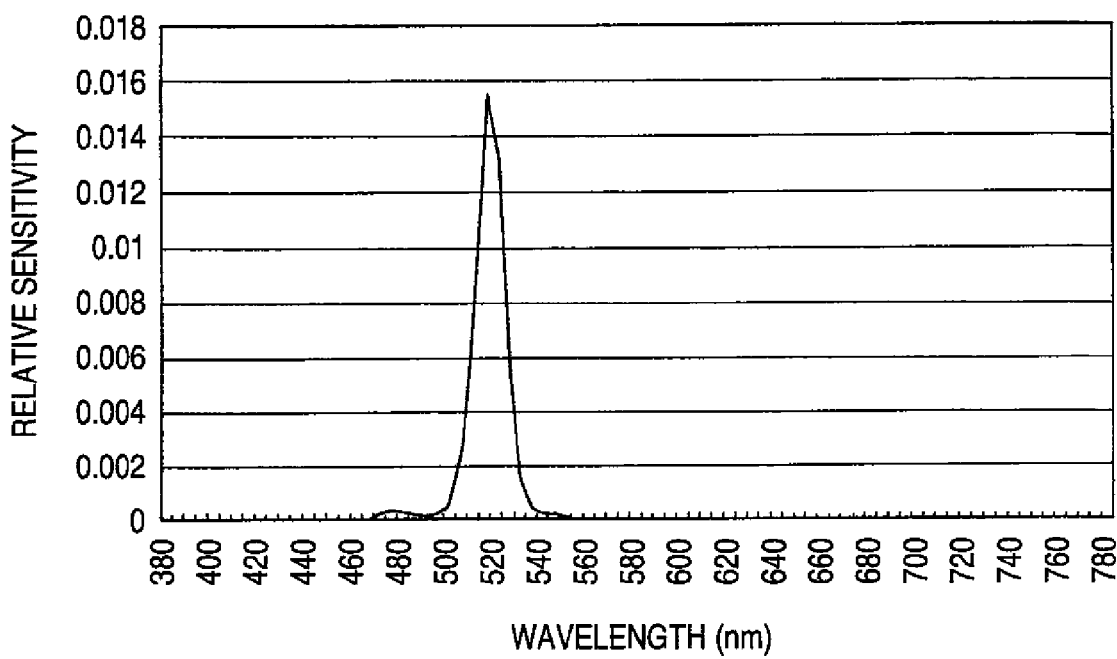
FIG. 5 is a graph showing a fourth spectral sensitivity according to another example of the embodiment of the invention.

The fourth spectral sensitivity shown in FIG. 5 (the spectral sensitivities of R, G and B are the same as those in FIG. 3) has a small value of a relative sensitivity (an axis of ordinate). For example, in a solid-state image pick-up device having one million pixels, one thousand pixels for distinguishing a light source type on one side are arranged in the region 3a shown in FIG. 1. Therefore, 4000 outputs in total are added to calculate the ratio value. Even if the sensitivities of the individual pixels are low, consequently, there is no problem.

Figure 6:
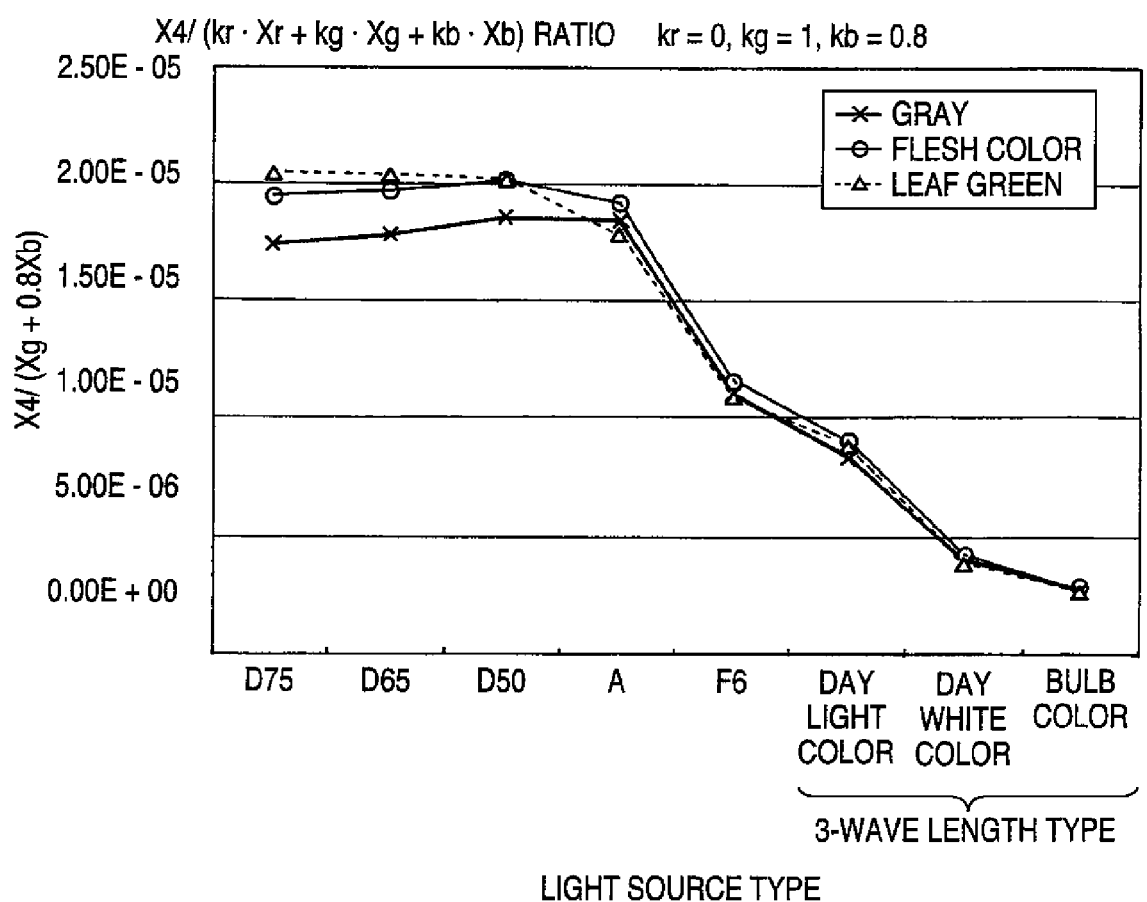
FIG. 6 is a chart showing a result of distinction which is obtained by using a pixel for distinguishing a light source type having the fourth spectral sensitivity illustrated in FIG. 5.

FIG. 6 is a chart showing a result obtained by calculating, for each light source type, the ratio value of $M=X4/(kg \cdot Xg + kb \cdot Xb + kr \cdot Xr) = X4/(Xg + 0.8Xb)$ when the pixel for distinguishing a light source type having the fourth spectral sensitivity illustrated in FIG. 5 is used and coefficients kr=0, kg=1 and kb=0.8 are set. In the case in which the photographing scene has the gray color, the flesh color or the leaf green color, the ratio value is set in order of (large) sunlight, A light source>F6 light source >3-wavelength type daylight color fluorescent lamp >3-wavelength type day white fluorescent lamp >3-wavelength type bulb color fluorescent lamp (small).

Thus, it is apparent that the photographing light source type can be distinguished into five groups with high precision.

Figure 7:
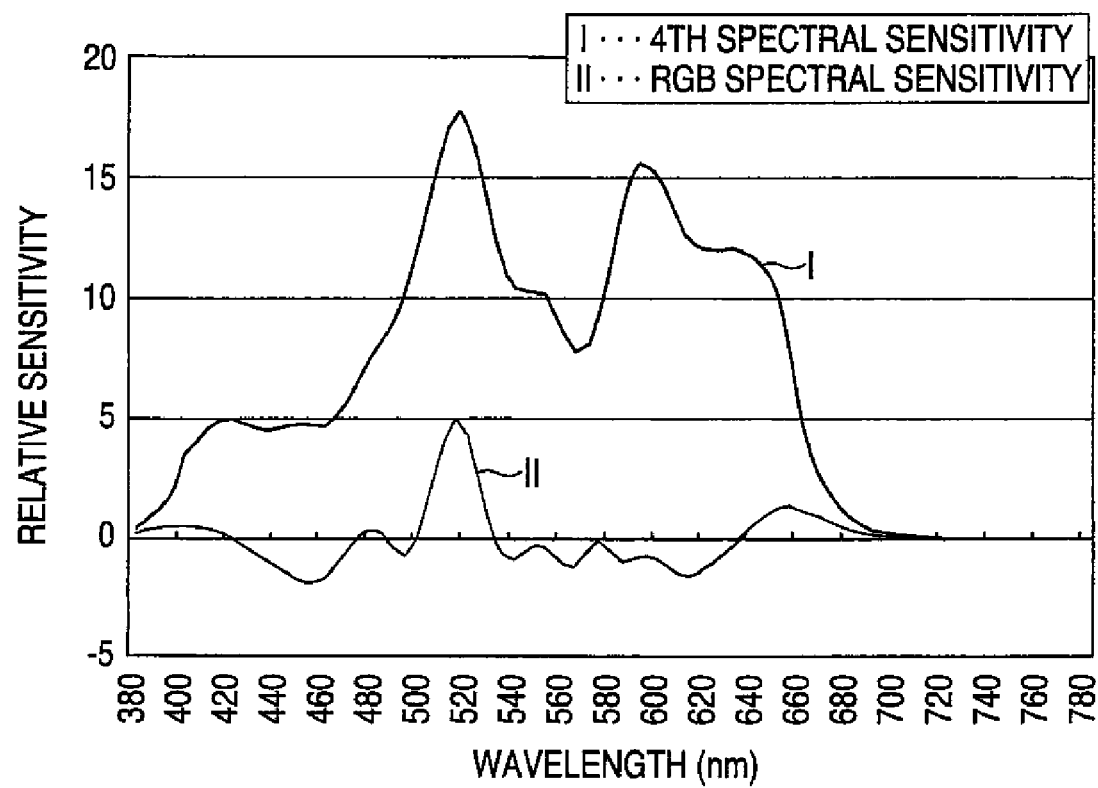
FIG. 7 is a graph showing a fourth spectral sensitivity according to a further example of the embodiment of the invention.

FIG. 7 is a chart showing a fourth spectral sensitivity created by mixing six kinds of pigments (PY139, PY185, PB15:6, PG7, PR122, PR224). The spectral sensitivities of R, G and B are the same as those of FIG. 3. By mixing the six kinds of pigments, a spectral sensitivity shown in a characteristic line I is obtained and there is an extra sensitivity other than the sensitivity in the vicinity of 520 nm. As described above, however, the spectral sensitivities of R, G and B are subtracted to obtain a spectral sensitivity shown in a characteristic line II.

More specifically, the light source type can be distinguished based on the ratio value $M=(X4-kr2 \cdot Xr-kg2 \cdot Xg-kb2 \cdot Xb)/(kr1 \cdot Xr + kg \cdot Xg + kb1 \cdot Xb)$.

As is apparent from the characteristic line II, the filter for distinguishing a light source type according to the embodiment transmits a light having a wavelength of 640 nm or more in addition to a wavelength range of approximately 520 nm. Referring to FIG. 2, a fluorescent lamp does not include the wavelength of 640 nm or more. In the embodiment, therefore, a light source type can mainly be distinguished in two wavelength regions (approximately 520 nm and 640 nm or more).

Figure 8:
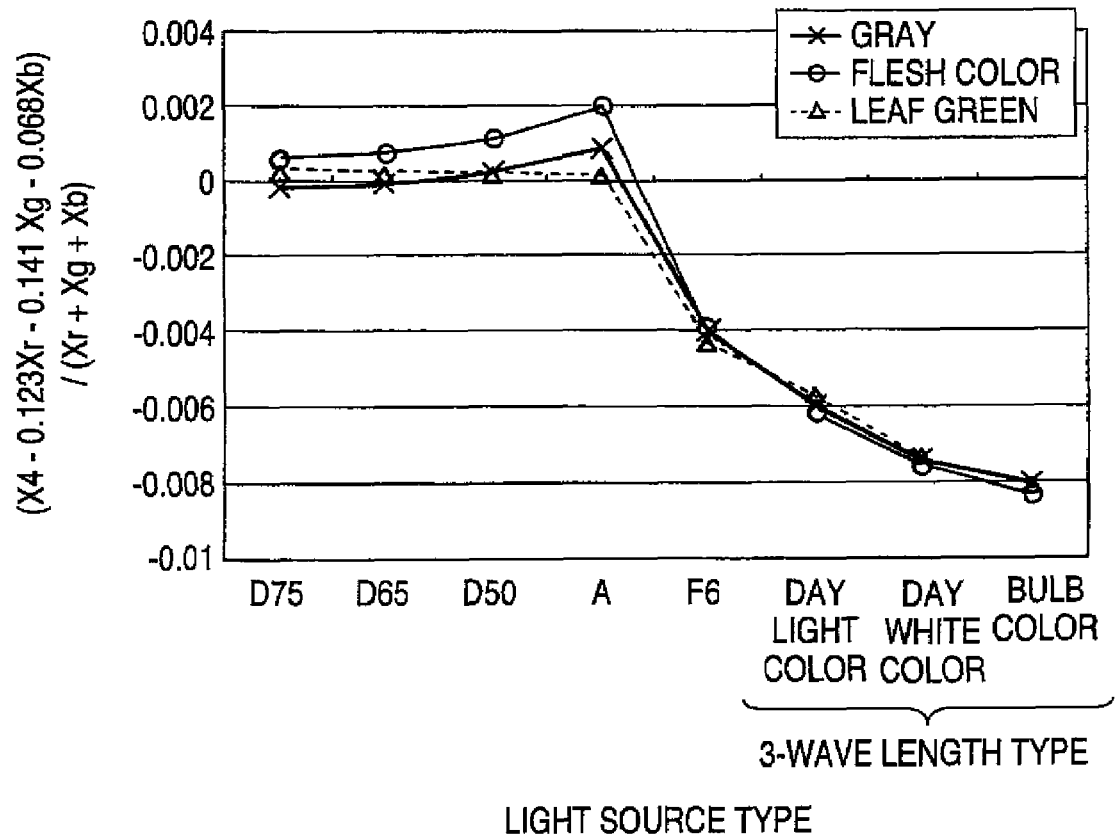
FIG. 8 is a chart showing a result of distinction which is obtained by using a pixel for distinguishing a light source type having the fourth spectral sensitivity illustrated in FIG. 7.

FIG. 8 shows a result obtained by calculating, for each light source type, a value of $M=(X4-0.123Xr-0.141\ Xg-0.068\ Xb)/(Xr+Xg+Xb)$ when kr1=kg1=kb1=1 and kr2=0.123, kg2=0.141 and kb2=0.068 are set in the equation for the ratio value M. In the case in which the photographing scene has the gray color, the flesh color or the leaf green color, the ratio value M is set in order of (large) sunlight, A light source>F6 light source >3-wavelength type daylight color fluorescent lamp >3-wavelength type day white fluorescent lamp >3-wavelength type bulb color fluorescent lamp (small).

Also in the embodiment, it is apparent that the photographing light source type can be distinguished into five groups with high precision.

According to the graph shown in FIG. 2, it is apparent that the light source type can be distinguished also in a wavelength region of 580 nm. For this reason, if a pixel for distinguishing a light source type having a sharp sensitivity in the vicinity of 580 nm in addition to 520 nm is manufactured, a distinguishing capability can be more enhanced. In this case, however, it is hard to distinguish the sunlight, the A light source and the F6 light source if the sensitivity in the vicinity of 580 nm is excessively increased. Therefore, care is to be taken. Moreover, it is desirable that the coefficients kr, kg and kb for calculating the ratio value M should also be readjusted to be optimum values.

It is preferable that the output values of R, G and B to be used in the calculation of the ratio value M should be obtained from R, G and B pixels in the vicinity of a pixel for distinguishing a light source type. A light for calculating the value of a numerator in the ratio value M and a light for calculating the value of a denominator are emitted from almost the same point of the scene so that the light source type can be distinguished with higher precision.

Moreover, the pixel for distinguishing a light source type, that is, the region 3a shown in FIG. 1 is continuously provided over the whole circumference of the invalid pixel region in the embodiment, it may be provided in a discrete position or may be collectively provided in a certain place. A region for mixing the pixels of R, G and B to be the denominator of the ratio value M may also be set optionally. For example, the outputs of the R, G and B pixels in a whole invalid pixel region may be mixed into one.

Furthermore, while the pixel for distinguishing a light source type is manufactured by providing the filter for distinguishing a light source type in place of the color filters of R, G and B to be provided in the photodiode of the solid-state image pick-up device in the embodiment, it is also possible to provide the filter for distinguishing a light source type by applying or sticking a pigment having a necessary spectral characteristic for a part of the cover glass of a chip when processing the chip of the solid-state image pick-up device.

(Second Embodiment)

Figure 9:
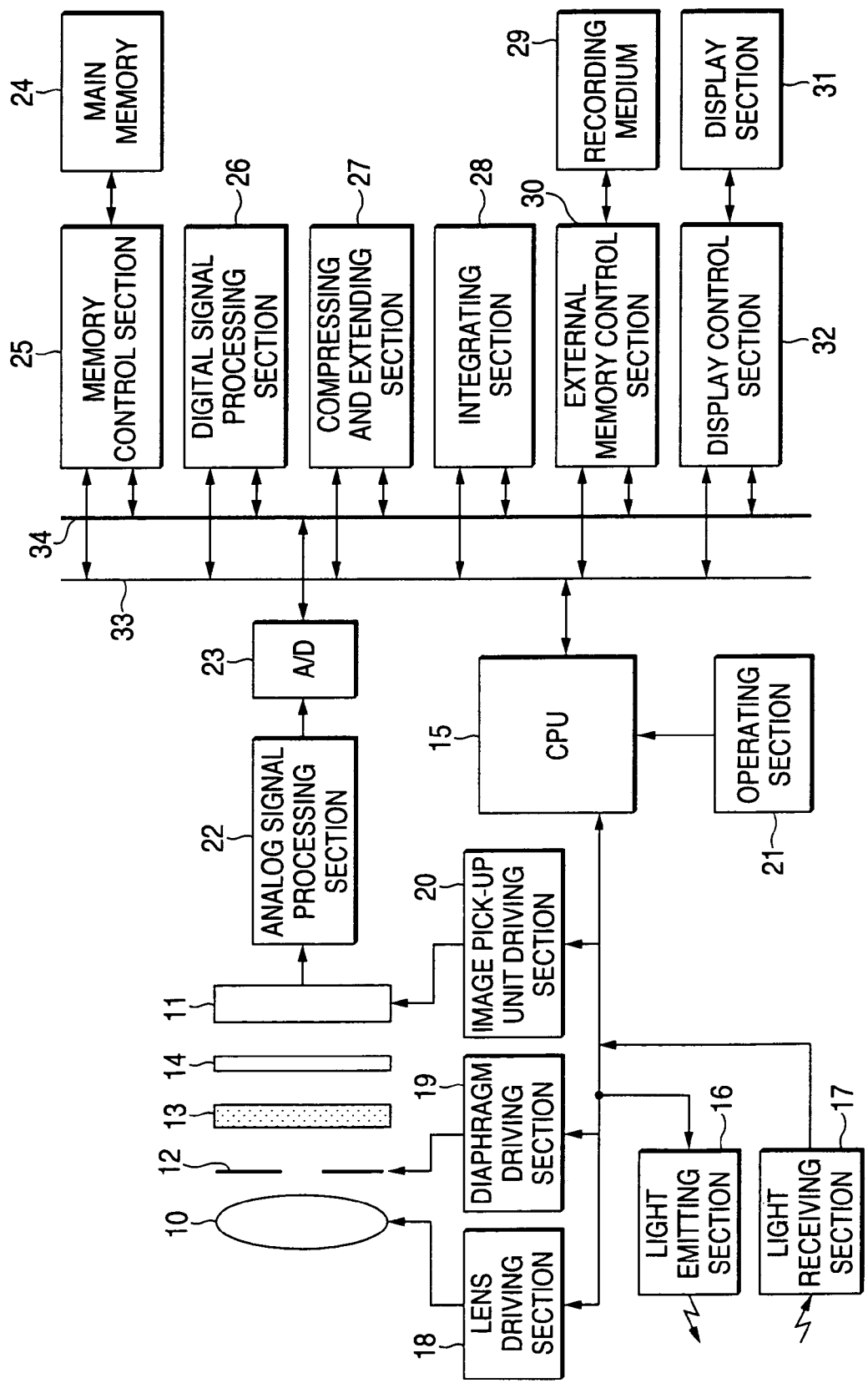
FIG. 9 is a block diagram showing the structure of a digital camera according to a second embodiment of the invention.

FIG. 9 is a diagram showing the structure of a digital still camera according to a second embodiment of the invention. While the digital still camera is taken as an example in the embodiment, the invention can also be applied to other kinds of digital cameras such as a digital video camera and a portable telephone having a camera.

The digital still camera shown in FIG. 9 comprises a photographing lens 10, a solid-state image pick-up device 11, a diaphragm 12 provided between both of them, an infrared ray cut filter 13, and an optical low-pass filter 14. A CPU 15 for controlling the whole digital still camera controls a light emitting section 16 for a flash and a light receiving section 17, and furthermore, controls a lens driving section 18 to adjust the position of the photographing lens 10 to a focus position and controls the amount of opening of the diaphragm 12 through a diaphragm driving section 19 to adjust an amount of exposure to be proper.

Moreover, the CPU 15 drives the solid-state image pick-up device 11 through an image pick-up device driving section 20 and outputs, as a color signal, the image of an object picked up through the photographing lens 10. Moreover, the instruction signal of a user is input to the CPU 15 through an operating section 21 and the CPU 15 carries out various control operations in accordance with the instruction. The solid-state image pick-up device 11 is a CCD having a honeycomb pixel arrangement, a CCD of a Bayer type or a CMOS sensor.

The electric control system of the digital still camera comprises an analog signal processing section 22 connected to the output of the solid-state image pick-up device 11 and an A/D converting circuit 23 for converting RGB color signals output from the analog signal processing section 22 into digital signals, and these are controlled by the CPU 15.

Furthermore, the electric control system of the digital still camera comprises a memory control section 25 connected to a main memory 24, a digital signal processing section 26 which will be described below in detail, a compressing and extending section 27 for compressing a pick-up image into a JPEG image and extending the compressed image, an integrating section 28 for integrating image data output from the solid-state image pick-up device 11 and converted into digital data for each of R, G and B and outputting each integrated value to the digital signal processing section 26, an external memory control section 30 to which a removable recording medium 29 is connected, and a display control section 32 to which a liquid crystal display section 31 mounted on the back face of the camera is connected, and these are mutually connected through a control bus 33 and a data bus 34 and are controlled in accordance with an instruction sent from the CPU 15.

While the digital signal processing section 26, the analog signal processing section 22 and the A/D converting circuit 23 shown in FIG. 9 can also be mounted as separate circuits on the digital still camera respectively, it is preferable that these should be manufactured on the same semiconductor substrate as the solid-state image pick-up device 11 by using an LSI manufacturing technology, thereby forming one solid-state image pick-up device.

Figure 10:
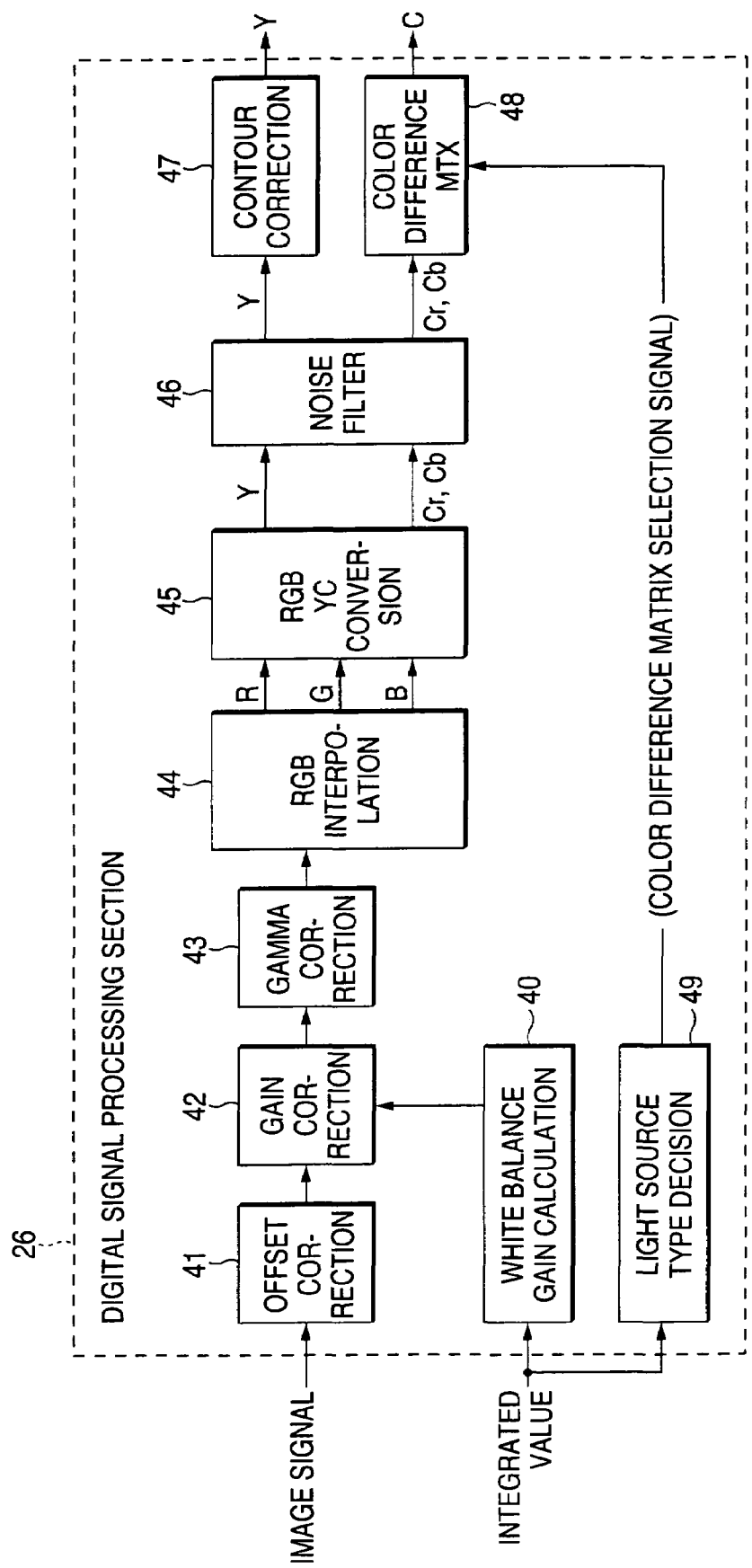
FIG. 10 is a diagram showing the detailed structure of a digital signal processing section illustrated in FIG. 1.

FIG. 10 is a diagram showing the detailed structure of the digital signal processing section 26 illustrated in FIG. 1. The digital signal processing section 26 can also be constituted by both a hardware circuit and software.

The digital signal processing section 26 in the shown example comprises a white balance gain calculating circuit 40 for fetching the output data of the integrating section 28 shown in FIG. 9 and calculating a gain value for white balance adjustment, an offset correcting circuit 41 for fetching an image signal for each of R, G and B colors output from the A/D converting circuit 23 and carrying out an offset processing, a gain correcting circuit 42 for fetching the output signal of the offset correcting circuit 41 and carrying out the white balance adjustment by using the gain value calculated by the gain calculating circuit 40, and a gamma correcting circuit 43 for carrying out a gamma correction by using a predetermined γ value for a signal output from the gamma correcting circuit 42.

The digital signal processing section 26 further comprises an RGB interpolation calculating section 44 for carrying out an interpolation calculation over the RGB color signals output from the gamma correcting circuit 43 to obtain the signals of the three colors R, G and B in pixel positions, an RGB/YC converting circuit 45 for obtaining a luminance signal Y and color difference signals Cr and Cb from the RGB signals obtained after the RGB interpolation calculation, a noise filter 46 for reducing a noise from the luminance signal Y and the color difference signals Cr and Cb, a contour correcting circuit 47 for carrying out a contour correction over the luminance signal Y after the noise reduction, a color difference matrix circuit 48 for multiplying the color difference signals Cr and Cb obtained after the noise reduction by a color difference matrix (C-MTX) to carry out a color correction, and a light source type deciding circuit 49 for fetching an integrated value output from the integrating section 28, deciding a light source type and outputting a color difference matrix selection signal to the color difference matrix circuit 48.

If the solid-state image pick-up device 11 is of a 3-plate type, the RGB interpolation calculating section 44 is not required. However, the solid-state image pick-up device 11 to be used in the embodiment is of a single plate type and only the signal for one of R, G and B is output from each pixel. Therefore, the degree of the colors which are not output, that is, the G and B color signals in a pixel for outputting R in the same pixel position is obtained from the G and B signals in surrounding pixels through the interpolation calculation.

The light source type deciding circuit 49 divides one screen having an image picked up by the solid-state image pick-up device 11 into 8×8=64 regions, for example, and calculates, from an integrated value, values of ΣR, ΣG and ΣB of a signal charge in each divided region, and obtains a set of data of ΣR/ΣG and data of ΣB/ΣG and plots these 64 sets of data into a two-dimensional space extended over an R/G axis and a B/G axis, and detects a photographing light source type based on the shape of the distribution.

The color difference matrix circuit 48 includes plural kinds of color difference matrices corresponding to light sources, and switches the color difference matrix to be used corresponding to the light source type obtained by the light source type deciding circuit 49, multiplies color difference signals Cr and Cb to be input by a color difference matrix (C-MTX) obtained after the switching as shown in the following equation 1, and outputs color difference signals Cr' and Cb' subjected to a color correction.

$$\text{When } [C-MTX] = \begin{bmatrix} a, b \\ c, d \end{bmatrix}$$ [Equation 1]

$$\begin{bmatrix} Cr' \\ Cb' \end{bmatrix} = [C-MTX] \times \begin{bmatrix} Cr \\ Cb \end{bmatrix}$$

Cr, Cr', Cb and Cb' have values of −128 to +127 (in case of 8 bits).

Figure 11:
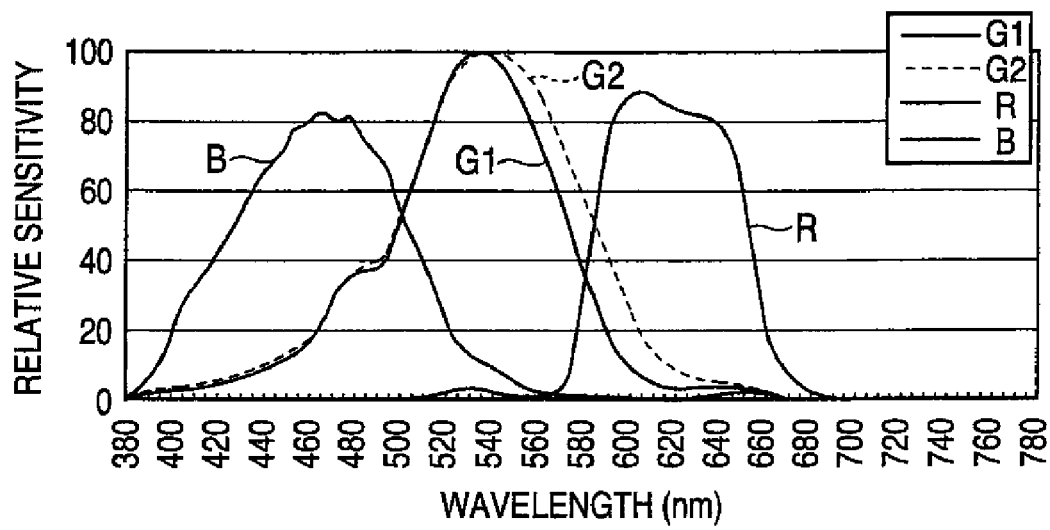
FIG. 11 is a graph showing each of the spectral sensitivities of a red color, a green color and a blue color of the digital camera illustrated in FIG. 9.

FIG. 11 is a graph showing the spectral sensitivity of each of the colors R, G and B in the digital still camera. For the spectral sensitivity of the green color, two kinds of G1 and G2 are prepared and compared by using a solid-state image pick-up device for R, G1 and B and a solid-state image pick-up device for R, G2 and B. When the peak sensitivity of the green color is set to be "100", sensitivities of G1 and G2 at 600 nm are "10" and "27" respectively. For a total G sensitivity, G2 is higher than G1 by approximately 24%.

In a digital still camera having the spectral sensitivities of R, G1 and B, a color difference matrix (C-MTX(G1)) obtained by optimizing a color difference matrix (C-MTX) to have an excellent color reproducibility in photographing under a sunlight (D65) is expressed in the following equation 2.

$$[C-MTX(G1)] = \begin{bmatrix} 1.61 & 0.18 \\ 0.22 & 1.97 \end{bmatrix}$$ [Equation 2]

Figure 12:
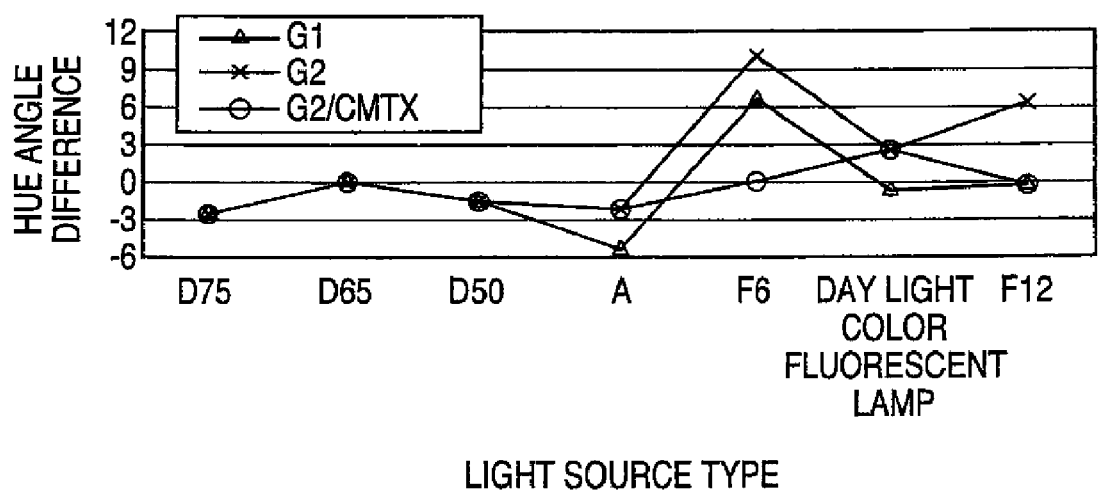
FIG. 12 is a graph showing the photographing light source dependency of a flesh color in the digital camera illustrated in FIG. 9.

FIG. 12 shows, in a triangular mark, the photographing light source dependency (hue angle difference) of a flesh color obtained by photographing with the color difference matrix C-MTX(G1) by means of various light sources (D75, D65, D50, an A light source (tungsten), an F6 light source, a 3-wavelength type daylight color fluorescent lamp and an F12 light source)

In a digital still camera having the spectral sensitivities of R, G2 and B, moreover, a color difference matrix (C-MTX (G2)) obtained by optimizing a color difference matrix (C-MTX) to have an excellent color reproducibility in photographing under a sunlight (D65) is expressed in the following equation 3.

[Equation 3]

[C-MTX(G2)]=1.68 0.16 0.25 1.91

FIG. 12 shows, in an x mark, the photographing light source dependency (hue angle difference) of a flesh color obtained by photographing with the color difference matrix C-MTX (G2) by means of various light sources (D75, D65, D50, an A light source (tungsten), an F6 light source, a 3-wavelength type daylight color fluorescent lamp and an F12 light source).

The spectral sensitivity G2 is further broadened toward the long wavelength side as compared with the spectral sensitivity G1 and the camera has a very high sensitivity. As shown in FIG. 12, particularly, it is apparent that the hue angle difference of the flesh color between the F6 light source and the F12 light source is increased and a hue is close to YG.

In the embodiment, in consideration of FIG. 12, the light source type is divided into three kinds of light sources, that is, the F6 light source, the F12 light source and another light source and three color difference matrices are prepared corresponding to these three kinds as shown in the following Table 1.

TABLE 1

| C-MTX (in case of G2) | | | | | |
|---|---|---|---|---|---|
| D65 and other light sources (excluding F6 and F12) | | F6 | | F12 | |
| 1.68 | 0.16 | 1.87 | −0.01 | 1.65 | −0.13 |
| 0.25 | 1.91 | 0.18 | 1.81 | 0.21 | 1.74 |

A light source type deciding circuit 49 in FIG. 10 discriminates three kinds of light source types and outputs a selection signal to the color difference matrix circuit 48 to use a color difference matrix corresponding to the light source type, thereby switching the color difference matrix.

In the digital still camera according to the embodiment, the color difference matrix is provided for each light source type. Even if the camera is caused to have a high sensitivity by using the solid-state image pick-up devices having the spectral sensitivities of R, G2 and B, therefore, the hue angle difference of the flesh color is reduced so that an excellent color reproducibility can be implemented in any light source type as shown in a ○ mark of FIG. 12.

Moreover, the following Table 2 shows the hue reproducing fidelity of a general color obtained during photographing under each of the light sources D65, F6 and F12 and compares the case in which the color difference matrix is fixed with the case in which it is switched. As is apparent from the Table 2, both the F6 light source and the F12 light source have higher color reproducing fidelities in the case in which the color difference matrix is switched than that in the case in which a color correction is carried out with a color difference matrix optimized for the D65 light source.

TABLE 2

General color reproducibility of G2 and G2/CMTX switching
Mean hue difference of approximately 210 general colors (Mean difference in hue from object color)

|  | D65 | F6 | F12 |
|---|---|---|---|
| CMTX fixation | 2.88 | 6.35 | 6.23 |
| CMTX switching | 2.88 | 3.99 | 3.73 |

(Third Embodiment)

Figure 13:
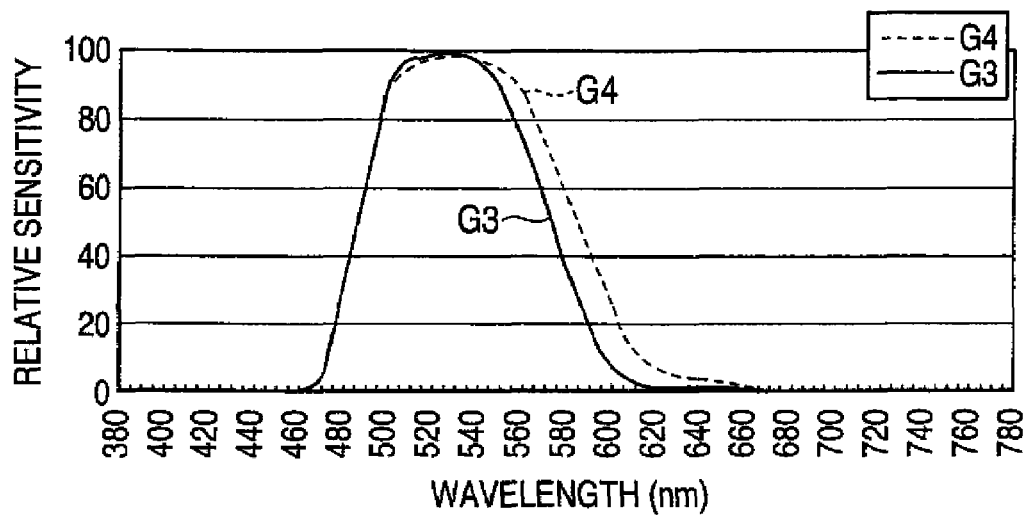
FIG. 13 is a graph showing the spectral sensitivity of a green color in a digital camera according to a second embodiment of the invention.

FIG. 13 is a graph showing a spectral sensitivity for the green color (G) of a digital still camera according to a third embodiment of the invention. In the embodiment, there are created two kinds of spectral sensitivities, that is, a spectral sensitivity G3 and a spectral sensitivity G4 obtained by broadening the spectral sensitivity G3 toward the long wavelength side. Referring to G3 and G4, the rising characteristic of a characteristic line on the short wavelength side is more improved than that in the spectral sensitivities G1 and G2 in FIG. 11, and the spectral sensitivities of R and B are the same as those in FIG. 9 and are not shown in FIG. 13.

When a peak sensitivity is set to be "100", a sensitivity at 600 nm is "10" for G3 and "31" for G4 and a total G sensitivity of G4 is more increased than that of G3 by approximately 27%.

Figure 14:
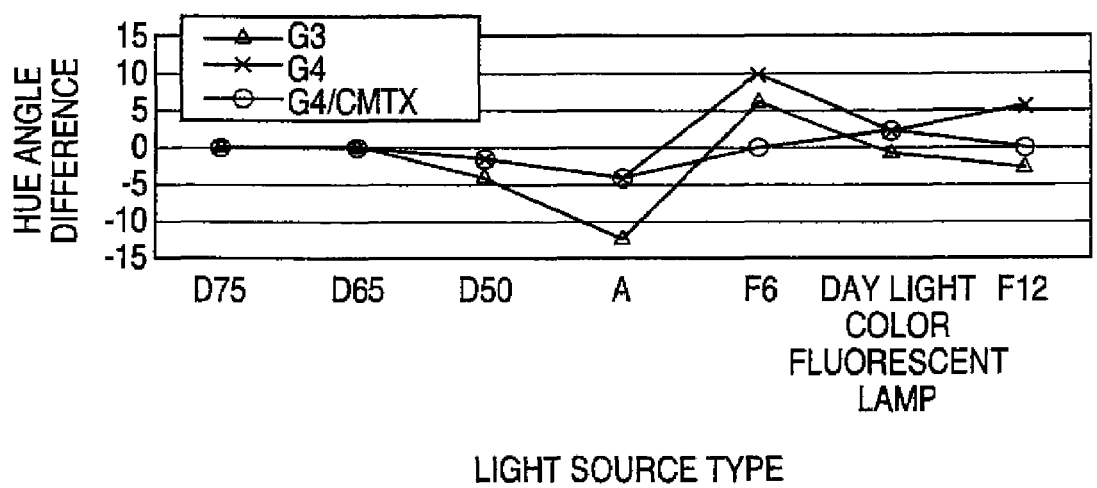
FIG. 14 is a graph showing the photographing light source dependency of a flesh color in the digital camera according to the third embodiment of the invention.

With this spectral sensitivity, a color difference matrix C-MTX is optimized to have an excellent color reproducibility in sunlight (D65) photographing. FIG. 14 shows, in a triangular mark and an x mark, a result obtained by checking the photographing light source dependency (hue angle difference) of a flesh color in the photographing with the C-MTX fixation by means of various light sources (D75, D65, D50, an A light source (tungsten), an F6 light source, a 3-wavelength type daylight color fluorescent lamp and an F12 light source).

Referring to FIG. 14, in G4 in which a spectral sensitivity is further broadened toward the long wavelength side to increase a total G sensitivity, the flesh colors in the F6 light source and the F12 light source are close to YG and the reproducibility of the flesh color is deteriorated.

Also in the embodiment, a color difference matrix for the F6 light source and a color difference matrix for the F12 light source are prepared in addition to a color difference matrix optimized for the D65 light source. When the F6 light source and the F12 light source are detected by a light source type deciding circuit 49, a color difference matrix to be used in a color difference matrix circuit 48 is switched.

It is apparent that this result is shown in a ○ mark of FIG. 14 and the reproducibility of the flesh color is improved with the spectral sensitivity G4. As shown in the following Table 3, moreover, it is apparent that the hue reproducing fidelity of a general color can also be enhanced.

TABLE 3

General color reproducibility of G4 and G4/CMTX switching
Mean hue difference of approximately 210 general colors (Mean difference in hue from object color)

|  | D65 | F6 | F12 |
|---|---|---|---|
| CMTX fixation | 2.13 | 6.09 | 5.32 |
| CMTX switching | 2.13 | 3.67 | 2.94 |

(Fourth Embodiment)

Figure 15:
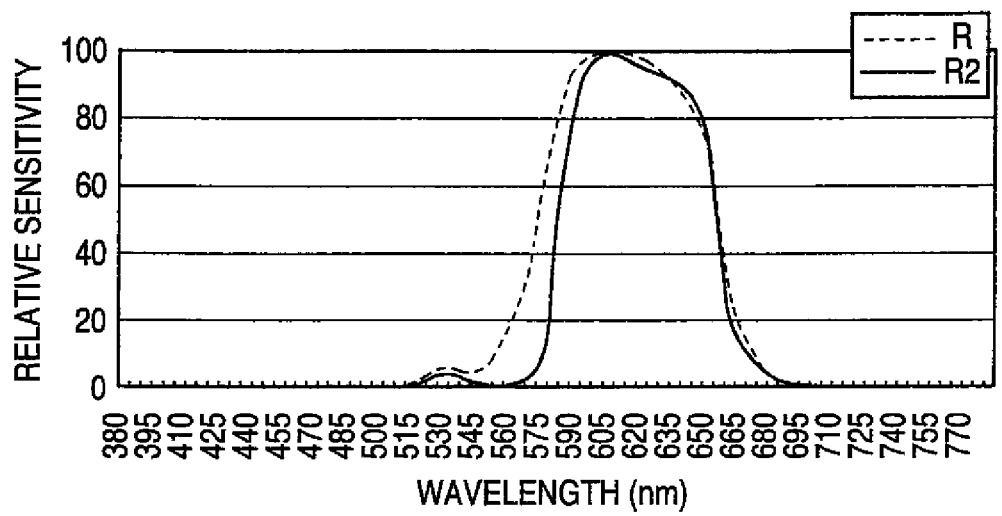
FIG. 15 is a graph showing the spectral sensitivity of a red color in a digital camera according to a fourth embodiment of the invention.

FIG. 15 is a graph showing a spectral sensitivity for the red color of a digital still camera according to a fourth embodiment of the invention. In the embodiment, a spectral sensitivity R2 broadened toward the short wavelength side is used for an ordinary spectral sensitivity R (which is the same as R in FIG. 11) as shown in a dotted line. The spectral sensitivity G4 according to the third embodiment (see FIG. 13) is used for the spectral sensitivity of a green color and a spectral sensitivity B of a blue color is the same as the spectral sensitivity B in FIG. 11.

When the peak sensitivity of a red color is set to be "100", a sensitivity at 575 nm is "61" for the spectral sensitivity R2 and "10" for the spectral sensitivity R.

Figure 16:
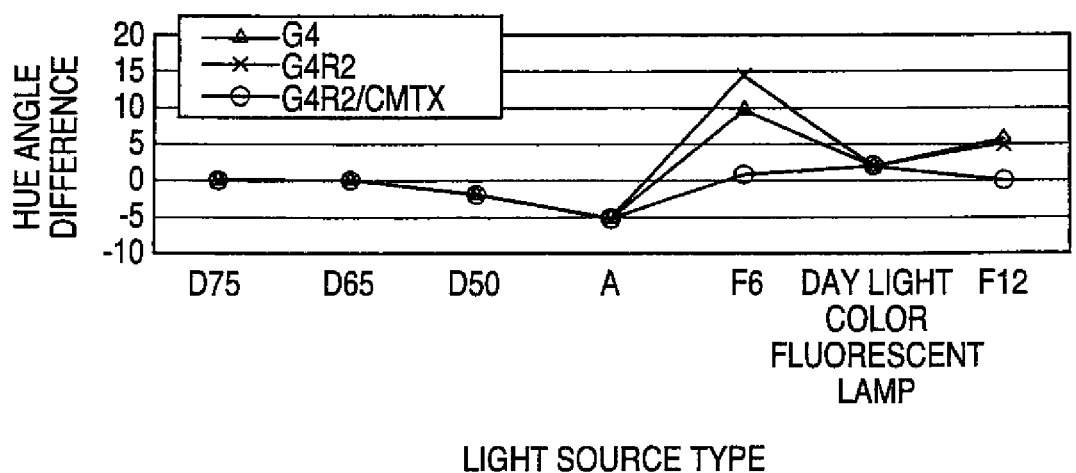
FIG. 16 is a graph showing the photographing light source dependency of a flesh color in the digital camera according to the third embodiment of the invention.

With these spectral sensitivities R2, G4 and B, a color difference matrix C-MTX is optimized to have an excellent color reproducibility in sunlight (D65) photographing. FIG. 16 shows, in an x mark, a result obtained by checking the photographing light source dependency (hue angle difference) of a flesh color in the photographing with the C-MTX fixation by means of various light sources (D75, D65, D50, an A light source (tungsten), an F6 light source, a 3-wavelength type daylight color fluorescent lamp and an F12 light source).

Referring to FIG. 16, in the combination of the spectral sensitivity R2 broadened toward the short wavelength side of the red color and the spectral sensitivity G4 broadened toward the long wavelength side of the green color, it is particularly apparent that the flesh color is considerably close to YG in the F6 light source.

Also in the embodiment, therefore, a color difference matrix for the F6 light source and a color difference matrix for the F12 light source are prepared in addition to a color difference matrix optimized for the D65 light source and a color difference matrix to be used in a color difference matrix circuit 48 is switched when the F6 light source or the F12 light source is detected by a light source type deciding circuit 49.

This result is shown in a ○ mark of FIG. 16. In the combination of the spectral sensitivities G4 and R2, the reproducibility of the flesh color can be improved and the flesh color can be particularly enhanced in the same manner as that in the case in which photographing is carried out by a sunlight. As shown in the following Table 4, moreover, the hue reproducing fidelity of a general color can also be enhanced.

TABLE 4

General color reproducibility of G4R2 and G4R2/CMTX switching
Mean hue difference of approximately 210 general colors (Mean difference in hue from object color)

|  | D65 | F6 | F12 |
|---|---|---|---|
| CMTX fixation | 2.14 | 6.36 | 4.83 |
| CMTX switching | 2.14 | 3.53 | 3.01 |

(Fifth Embodiment)

In each of the embodiments, one screen having an image picked up by a solid-state image pick-up device is divided into 8×8 64 regions, for example, and a light source type is obtained from the distribution of a set of data of ΣR/ΣG and data of ΣB/ΣG in each divided region. In some cases, however, it is hard to distinguish an F6 light source and an F12 light source with high precision by the conventional method. For example, it is hard to distinguish a scene full of a leaf green color in the shade of dark woods from an ordinary scene under the F6 light source in some cases.

In the embodiment, therefore, a light source type distinction sensor is provided in a camera to distinguish the F6 light source and the F12 light source with high precision. In the same manner as in the embodiments, consequently, a color reproducibility can be prevented from being deteriorated also in the case in which the spectral sensitivities of R and G are broadened to increase a camera sensitivity.

As described above, FIG. 2 is a graph in which the relative radiant energy distributions of various light sources are compared with an illuminance equalized. There are shown six kinds of light sources, that is, D55 (a sunlight), D75 (a sunlight), A (a tungsten light), F6 (an ordinary type white fluorescent lamp), a 3-wavelength type daylight white fluorescent lamp and F12 (a 3-wavelength type bulb color fluorescent lamp).

As is apparent from FIG. 2, it is preferable that the following sensors should be provided in order to distinguish the sunlight (and the A light source) from the F6 light source and the F12 light source with high precision.

① An infrared sensor for distinguishing a fluorescent lamp from the sunlight (and the A light source) or a sensor mainly having a sensitivity of 640 nm or more (which will be hereinafter referred to as an SLR).

② A sensor serving to distinguish the sunlight (and the A light source), the F6 light source and a 3-wavelength type fluorescent lamp and mainly having a sensitivity in the vicinity of 580 nm (which will be hereinafter referred to as an S580).

③ A sensor serving to distinguish the sunlight (and the A light source), the F6 light source and the 3-wavelength type fluorescent lamp and mainly having a sensitivity in the vicinity of 520 nm (which will be hereinafter referred to as an S520)

④ Any combination of ①, ② and ③ described above.

These sensors can be provided in a camera separately from a CCD or a CMOS or can also be incorporated and provided integrally with a solid-state image pick-up device such as the CCD or the CMOS. The digital still camera according to the embodiment has the structure shown in FIG. 9 and the solid-state image pick-up device has a light source type distinction sensor incorporated integrally therewith.

Even if an output sent from a light source type distinction sensor is singly used, a light source type cannot be distinguished. The distinction is carried out by a comparison operation with R, G and B outputs of other pixels. More specifically, the output sent from the light source type distinction sensor is represented by X4 and the outputs of R, G and B are represented by Xr, Xg and Xb respectively, and a ratio value M is calculated as follows:

$$M = X4/(kr \cdot Xr + kg \cdot Xg + kb \cdot Xb)$$

wherein kr, kg and kb are coefficients and optimum values are predetermined and set into a camera.

If necessary, moreover, it is also possible to use (X4−kr2·Xr−kg2·Xg−kb2·Xb) in place of a numerator of X4. kr2, kg2 and kb2 are coefficients.

Such a subtraction is introduced into the numerator for the following reason. In the case in which the spectral sensitivity of the light source type distinction sensor is broad or there is a sensitivity in an extra wavelength region, the introduction is effective for canceling the extra sensitivity.

By using the combination of the decision of the light source type based on the ratio value M thus obtained and a conventional deciding method, it is also possible to distinguish a difference in a color temperature in a 3-wavelength type fluorescent lamp with high precision, which is more preferable.

Figure 17:
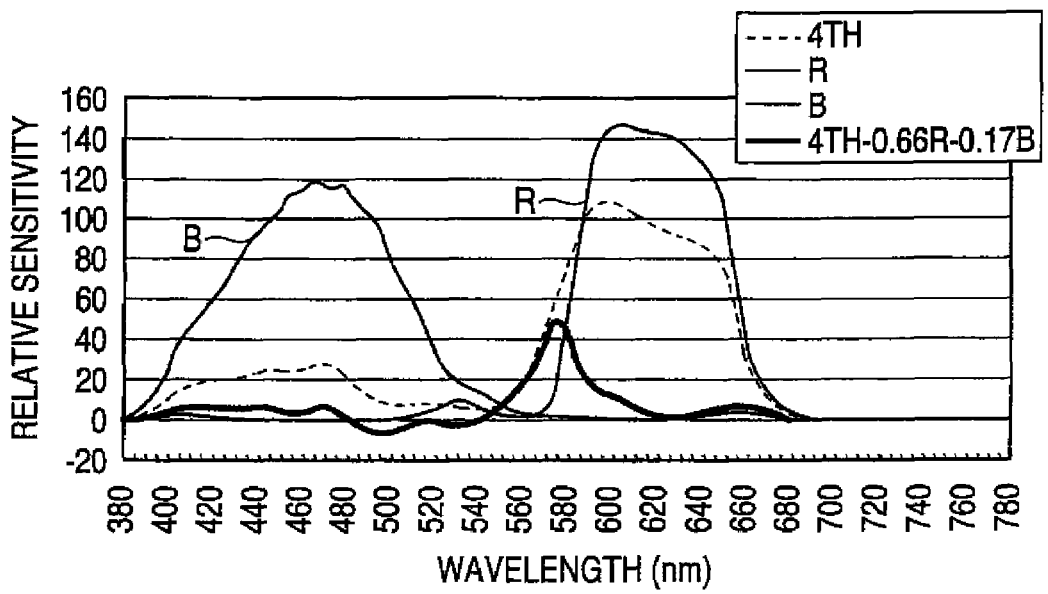
FIG. 17 is a graph showing a fourth spectral sensitivity of a light source type distinction sensor provided in the digital camera according to the fifth embodiment of the invention.

FIG. 17 is a chart showing a camera sensitivity obtained when the fourth spectral sensitivity is provided as the light source type distinction sensor in the invalid pixel region 3a of the solid-state image pick-up device. While the sensitivity of a green color is not shown, it is the same as that of G4 in the second embodiment.

By using the output X4 of the fourth spectral sensitivity and the outputs Xr, Xg and Xb of the pixels of R, G and B in the vicinity thereof, a ratio value M expressed in the following equation is calculated.

$$M = (X4 - kr2 \cdot Xr - kg2 \cdot Xg - kb2 \cdot Xb)/(kr \cdot Xr + kg \cdot Xg + kb \cdot Xb)$$

Figure 18:
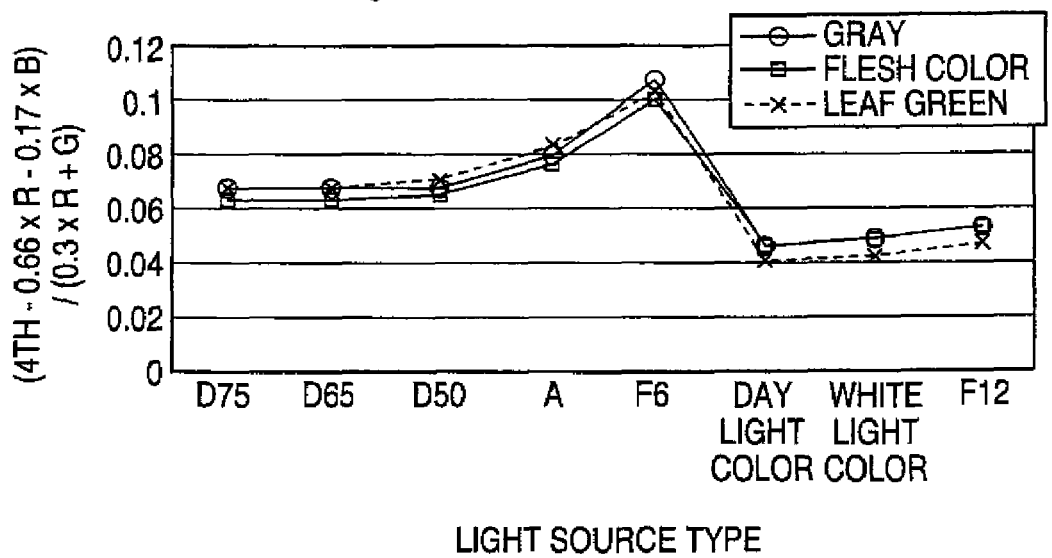
FIG. 18 is a graph showing a result of light source type distinction in the digital camera according to the fourth embodiment of the invention.

FIG. 18 is a chart showing the ratio value M for each photographing light source type. Kr2=0.66, kg2=0, kb2 0.17, kr=0.3, kg=1 and kb=0 are set.

In general, if a large number of pixels of a photographed image are mixed, a color thereof tends to be gray and data about gray shown in a ○ mark in FIG. 18 represent a general photographing scene. Referring to a scene (an x mark) which is full of a green color, moreover, it is hard to distinguish the photographing light source. By using the fourth spectral sensitivity, it is apparent that the photographing light source can be distinguished by a difference in the ratio value M with high precision. It is also apparent that the type of a fluorescent lamp can be distinguished as shown in a square mark of FIG. 18 in the close-up photographing for a human flesh color.

In the embodiment, the ratio value M is combined with a conventional light source type distinguishing method to cause the light source type deciding circuit in FIG. 10 to automatically decide whether a photographing light source is an F6 light source, an F12 light source or another light source. A color difference matrix for the F6 light source which is pre-stored in a camera, a color difference matrix for the F12 light source and a color difference matrix for another light source are switched corresponding to a light source type and a color correction is carried out by a color difference matrix circuit 48.

In the embodiment, consequently, even if an R sensitivity and a G sensitivity are broadened to enhance a camera sensitivity, the light source type can be distinguished with high precision to precisely select a color difference matrix to be used for the color correction. Consequently, the reproducibility of a color can be maintained to be excellent.

Figure 19:
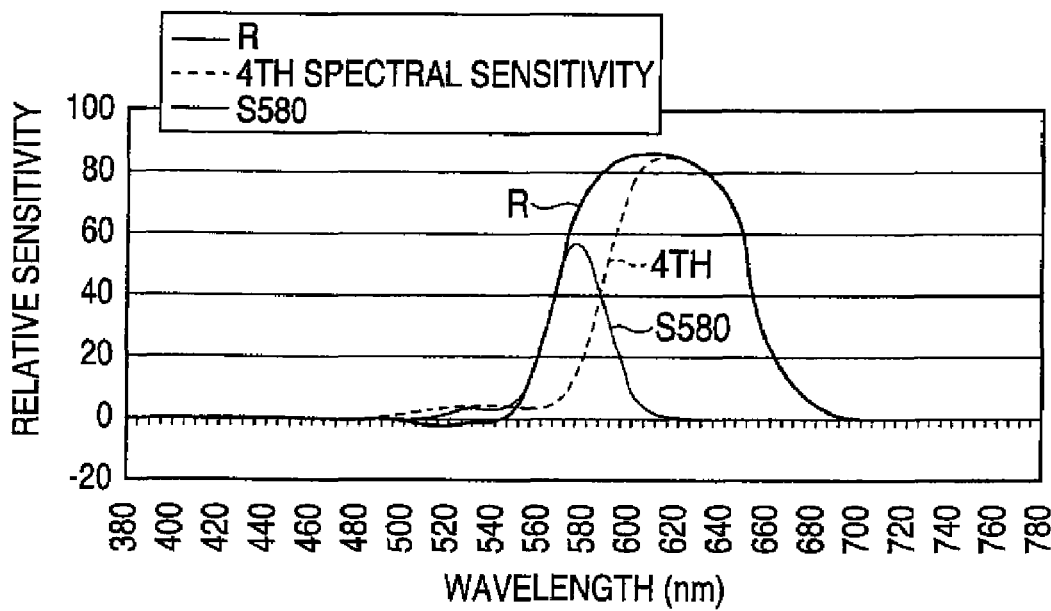
FIG. 19 is a graph showing another example of the fifth spectral sensitivity of the light source type distinction sensor.
Figure 20:
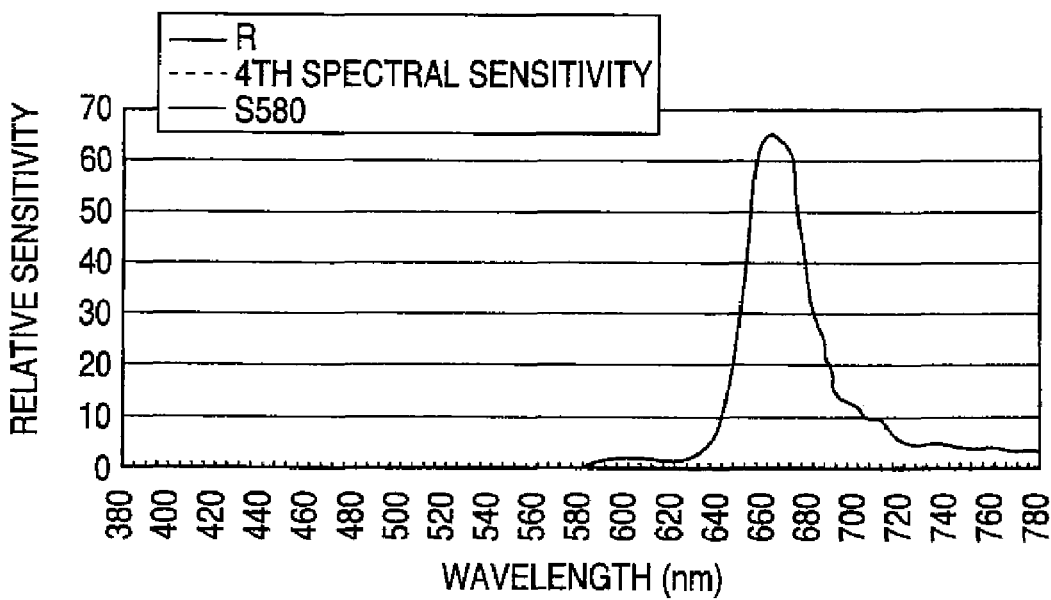
FIG. 20 is a graph showing yet another example of the fourth spectral sensitivity of the light source type distinction sensor.

In the embodiment, an example of the fourth spectral sensitivity is shown in a dotted line of FIG. 17. The fourth spectral sensitivity is not restricted to this example but various examples can be proposed. For example, referring to a fourth spectral sensitivity shown in a dotted line of FIG. 19, the sensor S580 is constituted by a spectral sensitivity R and the fourth spectral sensitivity. Moreover, a fourth spectral sensitivity shown in FIG. 20 constitutes the sensor SLR.

Figure 21:
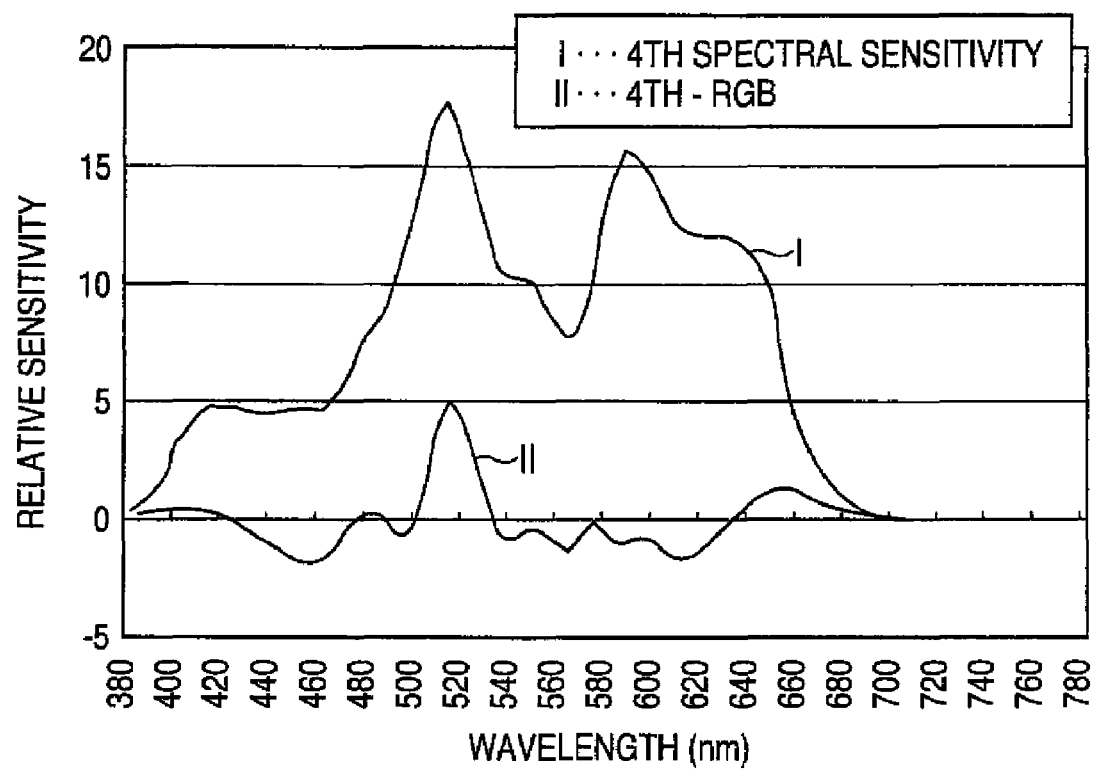
FIG. 21 is a graph showing a further example of the fourth spectral sensitivity of the light source type distinction sensor.

Furthermore, FIG. 21 is a chart showing a fourth spectral sensitivity created by mixing six kinds of pigments (PY139, PY185, PB15:6, PG7, PR122, PR224). By mixing the six kinds of pigments, a spectral sensitivity shown in a characteristic line I is obtained and there is an extra sensitivity other than the sensitivity in the vicinity of 520 nm. As described above, however, the spectral sensitivities of R, G and B are subtracted to obtain a spectral sensitivity shown in a characteristic line II.

As is apparent from the characteristic line II, the filter for distinguishing a light source type according to the embodiment transmits a light having a wavelength of 640 nm or more in addition to a wavelength range of approximately 520 nm. Referring to FIG. 2, a fluorescent lamp does not include the wavelength of 640 nm or more. In the embodiment, therefore, a light source type can mainly be distinguished in two wavelength regions (approximately 520 nm and 640 nm or more).

According to the digital camera in accordance with each of the embodiments described above, even if each of the spectral sensitivities of R and G is broadened to increase the sensitivity of the camera, the reproducibility of a color can be maintained to be excellent because a color correction is carried out by using a color difference matrix corresponding to a light source type.

It is preferable that the output values of R, G and B to be used in the calculation of the ratio value M should be obtained from R, G and B pixels in the vicinity of a pixel for distinguishing a light source type. A light for calculating the value of a numerator in the ratio value M and a light for calculating the value of a denominator are emitted from the same place so that the light source type can be distinguished with higher precision.

Moreover, while the pixel for distinguishing a light source type, that is, the region 3a shown in FIG. 1 is continuously provided over the whole circumference of the invalid pixel region in the embodiment, it may be provided in a discrete position or may be collectively provided in a certain place. A region for mixing the pixels of R, G and B to be the denominator of the ratio value M may also be set optionally. For example, the outputs of the R, G and B pixels in a whole invalid pixel region may be mixed into one to be used.

Furthermore, while the light source type distinction sensor is manufactured by providing the filter for distinguishing a light source type in place of the color filters of R, G and B to be provided in the photodiode of the solid-state image pick-up device in the embodiment, it is also possible to provide the filter for distinguishing a light source type by applying or sticking a pigment having a necessary spectral characteristic for a part of the cover glass of a chip when processing the chip of the solid-state image pick-up device.

Moreover, it is possible to broaden the spectral sensitivity of B in combination with the invention. Furthermore, it is possible to broaden the spectral sensitivity of G toward the short wavelength side or the spectral sensitivity of R toward the long wavelength side in optional combination with the invention. In any case, it is possible to enhance a color reproducibility by using C-MTX optimized for each light source type.

According to the invention, precision in the distinction of a photographing light source type can be improved and precision in the adjustment of the automatic white balance of an image pick-up apparatus can be enhanced. Consequently, it is possible to always record a fine color image.

Furthermore, it is possible to provide a digital camera capable of increasing a camera sensitivity and enhancing a color reproducibility.

What is claimed is:

1. An image pick-up apparatus comprising:
an optical lens system;
a solid-state image pick-up device that converts a light signal incident through the optical lens system into an electric signal, the solid-state image pick-up device comprising
first pixels that are used to pick up a color image,
a second pixel disposed in a predetermined region of the solid-state image pick-up device, the second pixel being used for distinguishing a light source type,
first to third filters mounted on the first pixels, and
a fourth filter with peak sensitivities at two or more different wavelengths, wherein one of said different wavelengths is a wavelength in the vicinity of 520 nm or a wavelength in the vicinity of 580 nm, the fourth filter being mounted on the second pixel; and
a control unit that distinguishes a light source type based on (i) a signal charge output from a first pixel mounted with the first filter and (ii) a signal charge output from the second pixel, wherein the control unit automatically adjusts a white balance of a color pick-up image of the solid-state image pick-up device.

2. The image pick-up apparatus according to claim 1, wherein the fourth filter transmits light having a wavelength of 640 nm or more.

3. The image pick-up apparatus according to claim 1, wherein the predetermined region is an invalid pixel region of the solid-state image pick-up device.

4. The image pick-up apparatus according to claim 1, wherein:
an optical spectral characteristic of the first filter corresponds to green,
an optical spectral characteristic of the second filter corresponds to red, and
an optical spectral characteristic of the third filter corresponds to blue.

5. The image pick-up apparatus according to claim 1, wherein the first pixels are disposed in a valid region of the solid-state image pick-up device.

6. The image pick-up apparatus according to claim 1, wherein the first to fourth filters are different from each other in optical spectral characteristics.

7. The image pick-up apparatus according to claim 1, wherein the control unit distinguishes the light source type based on a value obtained by dividing an output value corresponding to the signal charge output from the second pixel by at least an output value corresponding to the signal charge output from the first pixel mounted with the first filter.

8. The image pick-up apparatus according to claim 7, wherein the control unit distinguishes the light source type based on the value obtained by the following formula:
wherein
$X_1$ denotes an output value corresponding to the signal charge output from a first pixel mounted with the first filter,
$X_2$ denotes an output value corresponding to the signal charge output from the first pixel mounted with the second filter,
$X_3$ denotes an output value corresponding to the signal charge output from the first pixel mounted with the third filter,
$X_4$ denotes the output value corresponding to the signal charge output from the second pixel, and
k1 to k3 are coefficients.

9. The image pick-up apparatus according to claim 1, wherein the control unit adjusts a white balance of the color pick-up image of the solid-state image pick-up device based on the distinguished light source type.

10. A digital camera comprising:
a color image pick-up unit that picks up a color image of an object;
a signal processing unit that separates a color signal output from the color image pick-up unit into a luminance signal and a color difference signal, the signal processing unit multiplying the color difference signal by a color difference matrix, to carry out a color correction;
a color difference matrix switching unit that stores a color difference matrix for sunlight and a color difference matrix for a specific light source other than the sunlight, the color difference matrix switching unit switching the color difference matrix depending on whether a light source in photographing is the sunlight or the specific light source, to carry out the color correction; and
a light source type distinction sensor that distinguishes whether a light source in photographing is the sunlight or the specific light source based on a signal charge output from a pixel mounted with a filter, the filter having peak sensitivities at two or more different wavelengths, wherein one of said different wavelengths is wavelength in the vicinity of 520 nm or a wavelength in the vicinity of 580 nm.

11. The digital camera according to claim 10, wherein the specific light source is an F6 light source.

12. The digital camera according to claim 10, wherein the specific light source is an F12 light source.

13. The digital camera according to claim 10, wherein:
the specific light source includes an F6 light source and an F12 light source,
the color difference matrix switching unit stores color difference matrices for the F6 light source and the F12 light source as color difference matrices for specific light sources, and
the color difference matrix switching unit switches the color difference matrix depending on whether the specific light source is the F6 light source, the F12 light source, or the sunlight, to carry out the color correction.

14. The digital camera according to any of claims 10 to 13, wherein:
the color difference matrix switching unit automatically switches the color difference matrix based on a result of detection of the light source type distinction sensor.

15. The digital camera according to claim 14, wherein the light source type distinction sensor is incorporated integrally with the color image pick-up unit.

* * * * *